US012170882B2

(12) United States Patent
Vesa et al.

(10) Patent No.: US 12,170,882 B2
(45) Date of Patent: Dec. 17, 2024

(54) AUDIO PROCESSING FOR ADAPTIVE LOUDSPEAKER STEREO WIDENING

(71) Applicant: NOKIA TECHNOLOGIES OY, Espoo (FI)

(72) Inventors: Sampo Vesa, Helsinki (FI); Mikko-Ville Laitinen, Espoo (FI); Jussi Virolainen, Espoo (FI)

(73) Assignee: NOKIA TECHNOLOGIES OY, Espoo (FI)

(*) Notice: Subject to any disclaimer, the term of this patent is extended or adjusted under 35 U.S.C. 154(b) by 396 days.

(21) Appl. No.: 17/293,723

(22) PCT Filed: Nov. 8, 2019

(86) PCT No.: PCT/FI2019/050795
§ 371 (c)(1),
(2) Date: May 13, 2021

(87) PCT Pub. No.: WO2020/099716
PCT Pub. Date: May 22, 2020

(65) Prior Publication Data
US 2022/0014866 A1 Jan. 13, 2022

(30) Foreign Application Priority Data
Nov. 16, 2018 (GB) ...................................... 1818690

(51) Int. Cl.
*H04S 7/00* (2006.01)
*H04R 5/04* (2006.01)
*H04S 1/00* (2006.01)

(52) U.S. Cl.
CPC ............... *H04S 7/303* (2013.01); *H04R 5/04* (2013.01); *H04S 1/002* (2013.01); *H04S 7/307* (2013.01)

(58) Field of Classification Search
CPC .......... H04S 7/303; H04S 7/307; H04S 1/002; H04R 5/04
See application file for complete search history.

(56) References Cited

U.S. PATENT DOCUMENTS 4,837,824 A * 6/1989 Orban .................... H04S 1/002 381/1
6,111,958 A * 8/2000 Maher ...................... H04S 5/00 381/1
(Continued)

FOREIGN PATENT DOCUMENTS

CN 1860826 A 11/2006
CN 104919822 A 9/2015
(Continued)

OTHER PUBLICATIONS

Office Action for Chinese Application No. 201980087089.0 dated May 11, 2022, 9 pages.
(Continued)

*Primary Examiner* — Jason R Kurr
(74) *Attorney, Agent, or Firm* — ALSTON & BIRD LLP

(57) ABSTRACT

According to an example embodiment, a technique for processing an input audio signal (101) comprising a multi-channel audio signal is provided, the technique comprising: deriving (104), based on the input audio signal (101), a first signal component (105-1) comprising a multi-channel audio signal that represents a focus portion of a spatial audio image conveyed by the input audio signal and a second signal component (105-2) comprising a multi-channel audio signal that represents a non-focus portion of the spatial audio image; processing (112) the second signal component (105-2) into a modified second signal component (113) wherein the width of the spatial audio image is extended from that of the second signal component (105-2); and combining (114) the first signal component (105-1) and the modified second
(Continued)

100 signal component (112) into an output audio signal (115) comprising a multi-channel audio signal that represents partially extended spatial audio image.

18 Claims, 7 Drawing Sheets

(56) References Cited

U.S. PATENT DOCUMENTS

| | | | | |
|---|---|---|---|---|
| 7,991,176 | B2 * | 8/2011 | Kirkeby | H04R 5/04 381/334 |
| 8,295,493 | B2 | 10/2012 | Faller | |
| 8,391,498 | B2 * | 3/2013 | Potard | H04S 1/002 381/1 |
| 8,619,998 | B2 | 12/2013 | Walsh et al. | |
| 9,426,598 | B2 | 8/2016 | Walsh et al. | |
| 10,063,984 | B2 * | 8/2018 | Johnson | H04S 1/00 |
| 2002/0097880 | A1 * | 7/2002 | Kirkeby | H04S 1/002 381/1 |
| 2005/0271213 | A1 | 12/2005 | Kim | |
| 2005/0271214 | A1 * | 12/2005 | Kim | H04S 1/002 381/17 |
| 2006/0115090 | A1 | 6/2006 | Kirkeby | |
| 2009/0252341 | A1 | 10/2009 | Goodwin | |
| 2012/0328109 | A1 | 12/2012 | Harma et al. | |
| 2013/0070927 | A1 | 3/2013 | Harma et al. | |
| 2015/0248891 | A1 | 9/2015 | Adami et al. | |
| 2016/0249151 | A1 * | 8/2016 | Grosche | H04S 1/002 |
| 2018/0152787 | A1 | 5/2018 | Son et al. | |

FOREIGN PATENT DOCUMENTS

| | | | |
|---|---|---|---|
| EP | 2733964 | A1 | 5/2014 |
| GB | 2561595 | A | 10/2018 |
| WO | WO 2011/151771 | A1 | 12/2011 |
| WO | WO 2018/193163 | A1 | 10/2018 |

OTHER PUBLICATIONS

Extended European Search Report for European Application No. 19883814.6 dated Jul. 12, 2022, 10 pages.

Bharitkar et al., "Immersive Audio Synthesis and Rendering Over Loudspeakers", Immersive Audio Signal Processing, Ch. 4, Springer, (Jun. 9, 2006), pp. 75-97.

Floros et al., "Spatial Enhancement for Immersive Stereo Audio Applications", 2011 17th International Conference on Digital Signal Processing (DSP), (Jul. 6-8, 2011), 7 pages.

Goodwin, "Geometric Signal Decompositions for Spatial Audio Enhancement", IEEE International Conference on Acoustics, Speech and Signal Processing, (Mar. 31-Apr. 4, 2008), 4 pages.

Griesinger, "Phase Coherence as a Measure of Acoustic Quality, Part Two: Perceiving Engagement", Proceedings of the 20th International Conference on Acoustics, ICA 2010, (Aug. 23-27, 2010), 6 pages.

International Search Report and Written Opinion for International Application No. PCT/FI2019/050795 dated Mar. 9, 2020, 19 pages.

Kirkeby et al., "Fast Deconvolution of Multichannel Systems using Regularization", IEEE Transactions on Speech and Audio Processing, vol. 6, No. 2, (Mar. 1998), 7 pages.

Pulkki, "Virtual Source Positioning Using Vector Base Amplitude Panning", Journal of Audio Engineering Society, Inc., vol. 45, No. 6, (Jun. 1997), pp. 456-466.

Search Report for United Kingdom Application No. GB1818690.8 dated May 13, 2019, 1 page.

Wu et al., "Ambidio: Sound Stage Width Extension for Internal Laptop Loudspeakers", 136th Audio Engineering Society Convention 2014, (Apr. 26-29, 2014), 8 pages.

Intention to Grant for European Application No. 19883814.6 dated Jul. 4, 2024, 63 pages.

* cited by examiner

AUDIO PROCESSING FOR ADAPTIVE LOUDSPEAKER STEREO WIDENING

CROSS-REFERENCE TO RELATED APPLICATIONS

This application is a national phase entry of International Application No. PCT/FI2019/050795, filed Nov. 8, 2019, which claims priority to Great Britain Application No. 1818690.8, filed Nov. 16, 2018, the entire contents of which are incorporated herein by reference.

TECHNICAL FIELD

The example and non-limiting embodiments of the present invention relate to processing of audio signals. In particular, various embodiments of the present invention relate to modification of a spatial image represented by a multi-channel audio signal, such as a two-channel stereo signal.

BACKGROUND

Many portable handheld devices such as mobile phones, portable media player devices, tablet computers, laptop computers, etc. have a pair of loudspeakers that enable playback of stereophonic sound. Typically, the two loudspeakers are positioned at opposite ends or sides of the device to maximize the distance therebetween and thereby facilitate reproduction of stereophonic audio. However, due to small sizes of such devices the two loudspeakers are typically still relatively close to each other, thereby resulting in a narrow spatial audio image in the reproduced stereophonic audio. Consequently, the perceived spatial audio image may be quite different from that perceivable by playing back the same stereophonic audio signal e.g. via loudspeakers of a home stereo system, where the two loudspeakers can be arranged in suitable positions with respect to each other (e.g. sufficiently far from each other) to ensure reproduction of spatial audio image in its full width.

So-called stereo widening is a technique known in the art for enhancing the perceivable spatial audio image of a stereophonic audio signal when reproduced via loudspeakers of a portable handheld device. Such a technique aims at processing a stereophonic audio signal such that reproduced sound is not only perceived as originating from directions that are localized between the loudspeakers but at least part of the sound field is perceived as if it originated from directions that are not localized between the loudspeakers, thereby widening the perceivable width of spatial audio image from that conveyed in the stereophonic audio signal. Herein, we refer to such spatial audio image as a widened or enlarged spatial audio image. An example of processing that provides stereo widening is described in O. Kirkeby, P. A. Nelson, H. Hamada and F. Orduna-Bustamante, "Fast deconvolution of multichannel systems using regularization," IEEE Transactions on Speech and Audio Processing, vol. 6.

While outlined above via references to a two-channel stereophonic audio signal, stereo widening may be applied to multi-channel audio signals that have more than two channels, such as 5.1-channel or 7.1-channel surround sound for playback via a pair of loudspeakers (of a portable handheld device). In some contexts, the term virtual surround is applied to refer to a processed audio signal that conveys a spatial audio image originally conveyed in a multi-channel surround audio signal. Hence, even though the term stereo widening is predominantly applied throughout this disclosure, this term should be construed broadly, encompassing a technique for processing the spatial audio image conveyed in a multi-channel audio signal (i.e. a two-channel stereophonic audio signal or a surround sound of more than two channels) to provide audio playback at widened spatial audio image.

For brevity and clarity of description, in this disclosure we use the term multi-channel audio signal to refer to audio signals that have two or more channels. Moreover, the term stereo signal is used to refer to a stereophonic audio signal and the term surround signal is used to refer to a multi-channel audio signal having more than two channels.

When applied to a stereo signal, stereo widening techniques known in the art typically involve adding a processed (e.g. filtered) version of a contralateral channel signal to each of the left and right channel signals of the stereo signal in order to derive an output stereo signal having a widened spatial audio image (referred to in the following as a widened stereo signal). In other words, a processed version of the right channel signal of the stereo signal is added to the left channel signal of the stereo signal to create the left channel of a widened stereo signal and a processed version of the left channel signal of the stereo signal is added to the right channel signal of the stereo signal to create the right channel of the widened stereo signal. Moreover, the procedure of deriving the widened stereo signal may further involve pre-filtering (or otherwise processing) each of the left and right channel signals of the stereo signal prior to adding the respective processed contralateral signals thereto in order to preserve desired frequency response in the widened stereo signal.

Along the lines described above, stereo widening readily generalizes into widening the spatial audio image of a multi-channel input audio signal, thereby deriving an output multi-channel audio signal having a widened spatial audio image (referred to in the following as a widened multi-channel signal). In this regard, the processing involves creating the left channel of the widened multi-channel audio signal as a sum of (first) filtered versions of channels of the multi-channel input audio signal and creating the right channel of the widened multi-channel audio signal as a sum of (second) filtered versions of channels of the multi-channel input audio signal. Herein, a dedicated predefined filter may be provided for each pair of an input channel (channels of the multi-channel input signal) and an output channel (left and right). As an example in this regard, the left and right channel signals of the widened multi-channel signal $S_{out,left}$ and $S_{out,right}$, respectively, may be defined on basis of channels of a multi-channel audio signal S according to the equation (1):

$$S_{out,left}(b,n)=\Sigma_i S(i,b,n)H_{left}(i,b),$$

$$S_{out,right}(b,n)=\Sigma_i S(i,b,n)H_{right}(i,b) \quad (1)$$

where S(i,b,n) denotes frequency bin b in time frame n of channel i of the multi-channel signal S, $H_{left}(i,b)$ denotes a filter for filtering frequency bin b of channel i of the multi-channel signal S to create a respective channel component for creation of the left channel signal $S_{out,left}(b,n)$, and $H_{right}(i,b)$ denotes a filter for filtering frequency bin b of channel i of the multi-channel signal S to create a respective channel component for creation of the right channel signal $S_{out,right}(b,n)$.

In practice, summing the processed contralateral signals to the (processed) left and right channel signals of the multi-channel signal results in reduction of the available dynamic range for driving the loudspeakers applied for playback. On the other hand, in many portable handheld devices that are small in size the loudspeakers are likewise small and hence typically prone to distortion already at relatively low signal levels, and introduction of the signal component arising from the (processed) contralateral signals in the played back signal may result in a situation where the distortion occurs already at lower perceivable signal levels that without the stereo widening. Therefore, in order to ensure undistorted sound, the audio playback level of a widened stereo signal typically needs to be lower than that of the unprocessed stereo signal. Consequently, the widened stereo signal is typically perceived as softer and/or more distorted than its unwidened counterpart.

An additional challenge involved in stereo widening is degraded engagement and timbre in the central part of the spatial audio image (the concept of "engagement" is discussed, for example, in D. Griesinger, "Phase Coherence as a Measure of Acoustic Quality, part two: Perceiving Engagement", available at the time of filing of the present patent application e.g. at http://www.akutek.info/Papers/DG_Perceiving_Engagement.pdf). In many real-life stereo signals the central part of the spatial audio image includes perceptually important audio content, e.g. in case of music the voice of the vocalist is typically rendered in the center of the spatial audio image. A sound component that is in the center of the spatial audio image is rendered by reproducing the same signal in both channels of the stereo signal and hence via both loudspeakers of a device. When stereo widening as applied to such an input stereo signal (e.g. according to the equation (1) above), each channel of the resulting widened stereo signal involves outcome of two filtering operations carried out for the channels of the input stereo signal. This may result in a comb filtering effect, which may cause differences in the perceived timbre, which may be referred to as 'coloration' of the sound. Moreover, the comb filtering effect may further result in degradation of the engagement of the sound source.

SUMMARY

According to an example embodiment, a method for processing an input audio signal comprising a multi-channel audio signal is provided, the method comprising: deriving, based on the input audio signal, a first signal component comprising a multi-channel audio signal that represents a focus portion of a spatial audio image conveyed by the input audio signal and a second signal component comprising a multi-channel audio signal that represents a non-focus portion of the spatial audio image; processing the second signal component into a modified second signal component wherein the width of the spatial audio image is extended from that of the second signal component; and combining the first signal component and the modified second signal component into an output audio signal comprising a multi-channel audio signal that represents partially extended spatial audio image.

According to another example embodiment, an apparatus for processing an input audio signal comprising a multi-channel audio signal is provided, the apparatus comprising: a signal decomposer for deriving, based on the input audio signal, a first signal component comprising a multi-channel audio signal that represents a focus portion of a spatial audio image conveyed by the input audio signal and a second signal component comprising a multi-channel audio signal that represents a non-focus portion of the spatial audio image; a stereo widening processor for processing the second signal component into a modified second signal component wherein the width of the spatial audio image is extended from that of the second signal component; and a signal combiner for combining the first signal component and the modified second signal component into an output audio signal comprising a multi-channel audio signal that represents partially extended spatial audio image.

According to another example embodiment, an apparatus for processing an input audio signal comprising a multi-channel audio signal is provided, the apparatus configured to: derive, based on the input audio signal, a first signal component comprising a multi-channel audio signal that represents a focus portion of a spatial audio image conveyed by the input audio signal and a second signal component comprising a multi-channel audio signal that represents a non-focus portion of the spatial audio image; process the second signal component into a modified second signal component wherein the width of the spatial audio image is extended from that of the second signal component; and combine the first signal component and the modified second signal component into an output audio signal comprising a multi-channel audio signal that represents partially extended spatial audio image.

According to another example embodiment, an apparatus for processing an input audio signal comprising a multi-channel audio signal is provided, the apparatus comprising: a means for deriving, based on the input audio signal, a first signal component comprising a multi-channel audio signal that represents a focus portion of a spatial audio image conveyed by the input audio signal and a second signal component comprising a multi-channel audio signal that represents a non-focus portion of the spatial audio image; a means for processing the second signal component into a modified second signal component wherein the width of the spatial audio image is extended from that of the second signal component; and a means for combining the first signal component and the modified second signal component into an output audio signal comprising a multi-channel audio signal that represents partially extended spatial audio image.

According to another example embodiment, an apparatus for processing an input audio signal comprising a multi-channel audio signal is provided, wherein the apparatus comprises at least one processor; and at least one memory including computer program code, which when executed by the at least one processor, causes the apparatus to: derive, based on the input audio signal, a first signal component comprising a multi-channel audio signal that represents a focus portion of a spatial audio image conveyed by the input audio signal and a second signal component comprising a multi-channel audio signal that represents a non-focus portion of the spatial audio image; process the second signal component into a modified second signal component wherein the width of the spatial audio image is extended from that of the second signal component; and combine the first signal component and the modified second signal component into an output audio signal comprising a multi-channel audio signal that represents partially extended spatial audio image.

According to another example embodiment, a computer program is provided, the computer program comprising computer readable program code configured to cause performing at least a method according to the example embodiment described in the foregoing when said program code is executed on a computing apparatus.

The computer program according to an example embodiment may be embodied on a volatile or a non-volatile computer-readable record medium, for example as a computer program product comprising at least one computer readable non-transitory medium having program code stored thereon, the program which when executed by an apparatus cause the apparatus at least to perform the operations described hereinbefore for the computer program according to an example embodiment of the invention.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where.

DESCRIPTION OF SOME EMBODIMENTS

Figure 1A:
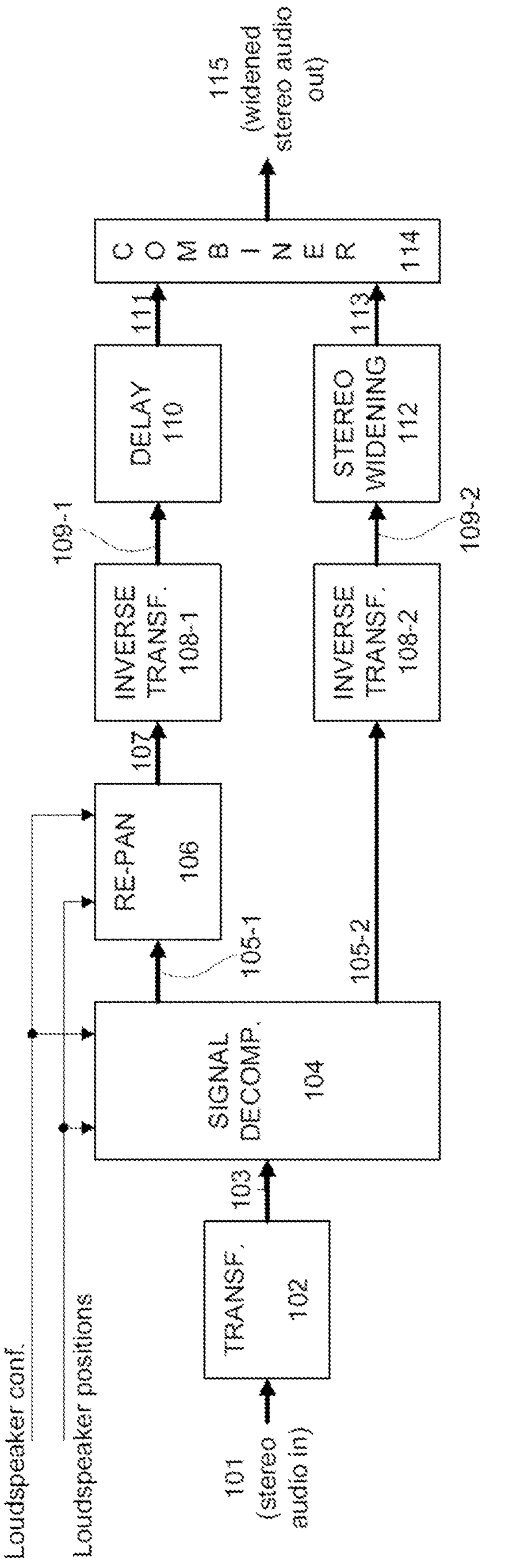
FIG. 1A illustrates a block diagram of some elements of an audio processing system according to an example.

FIG. 1A illustrates a block diagram of some components and/or entities of an audio processing system 100 that may serve as framework for various embodiments of the audio processing technique described in the present disclosure. The audio processing system 100 obtains a stereophonic audio signal as an input signal 101 and provides a stereophonic audio signal having at least partially widened spatial audio image as an output signal 115. The input signal 101 and the output signal 115 are referred to in the following as a stereo signal 101 and a widened stereo signal 115, respectively. In the following examples that pertain to the audio processing system 100, each of these signals is assumed to be a respective two-channel stereophonic audio signal unless explicitly stated otherwise. Moreover, also each of the intermediate audio signals derived on basis of the input signal 101 are likewise respective two-channel audio signals unless explicitly state otherwise.

Nevertheless, the audio processing system 100 readily generalizes into a one that enables processing of a spatial audio signal (i.e. a multi-channel audio signal with more than two channels, such as a 5.1-channel spatial audio signal or a 7.1-channel spatial audio signal), some aspects of which are also described in the examples provided in the following.

The audio processing system 100 may further receive two control inputs: a first control input that indicates a target loudspeaker configuration applied in the stereo signal 101 and a second control input that indicates output loudspeaker configuration in a device intended for playback of the widened stereo signal 115.

The audio processing system 100 according to the example illustrated in FIG. 1A comprises a transform entity (or a transformer) 102 for converting the stereo audio signal 101 from time domain into a transform domain stereo signal 103, a signal decomposer 104 for deriving, based on the transform-domain stereo signal 103, a first signal component 105-1 that represents a focus portion of the spatial audio image and a second signal component 105-2 that represents a non-focus portion of the spatial audio image, a re-panner 106 for generating, on basis of the first signal component 105-1, a modified first signal component 107, where one or more sound sources represented in the focus portion of the spatial audio image are repositioned in dependence of the target loudspeaker configuration and/or in dependence of the output loudspeaker configuration in the device intended for playback of the widened stereo signal 115, an inverse transform entity 108-1 for converting the modified first signal component 107 from the transform domain to a time-domain modified first signal component 109-1, an inverse transform entity 108-2 for converting the second signal component 105-2 from the transform domain to a time-domain second signal component 109-2, a delay element 110 for delaying the modified first signal component 109-1 by a predefined time delay, a stereo widening processor 112 for generating, on basis of the second signal component 109-2, a modified second signal component 113 where the width of a spatial audio image is extended from that of the second signal component 109-2, and a signal combiner 114 for combining the delayed first signal component 111 and the modified second signal component 113 into a widened stereo signal 115 that conveys a partially extended spatial audio image.

Figure 1B:
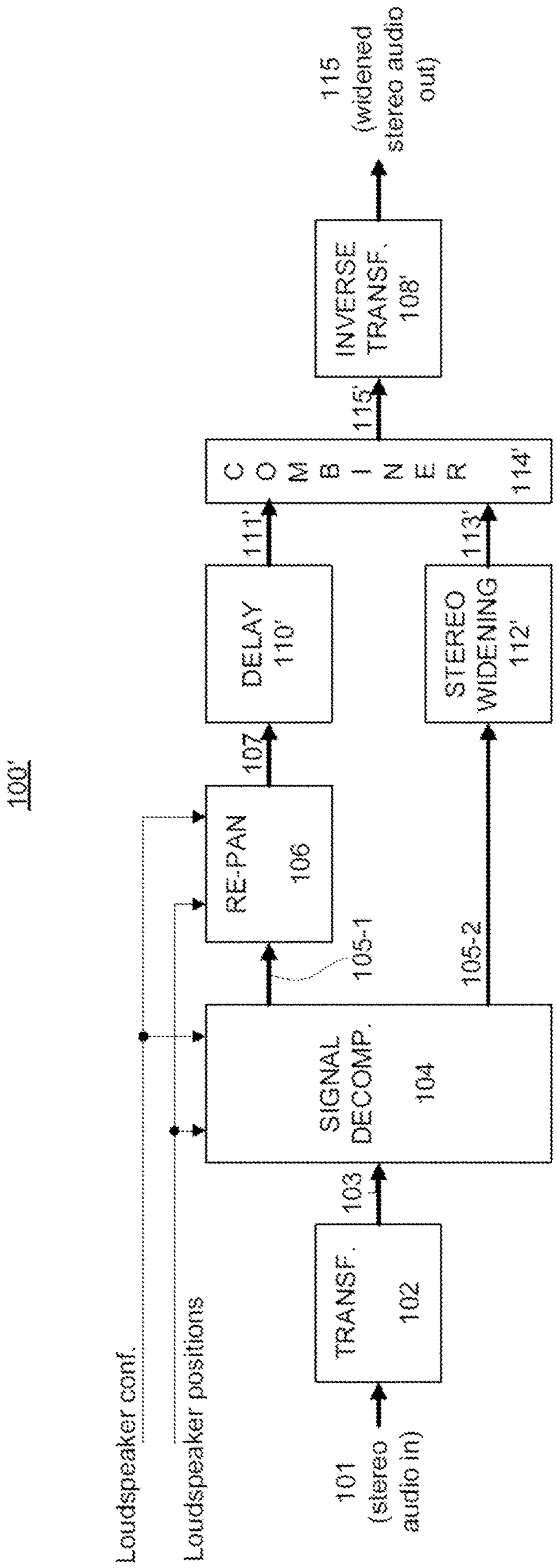
FIG. 1B illustrates a block diagram of some elements of an audio processing system according to an example.

FIG. 1B illustrates a block diagram of some components and/or entities of an audio processing system 100', which is a variation of the audio processing system 100 illustrated in FIG. 1A. In the audio processing system 100', differences to the audio processing system 100 are that the inverse transform entities 108-1 and 108-2 are omitted, the delay element 100 is replaced with the optional delay element 110' for delaying the modified first signal component 107 into delayed modified first signal component 111', the stereo widening processor 112 is replaced with a stereo widening processor 112' for generating, on basis of the transform-domain second signal component 105-2, a modified (transform-domain) second signal component 113', and the signal combiner 114 is replaced with a signal combiner 114' for combining the delayed modified first signal component 111' and the modified second signal component 113' into a widened stereo signal 115' in the transform domain. Moreover, the audio processing system 100' comprises a transform entity 108' for converting the widened stereo signal 115' from the transform domain into a time-domain widened stereo signal 115. In case the optional delay element 110' is omitted, the signal combiner 114' receives the modified first signal component 107 (instead of the delayed version thereof) and operates to combine modified first signal component 107 with the modified second signal component 113' to create the transform-domain widened stereo signal 115'.

In the following, the audio processing technique described in the present disclosure is predominantly described via examples that pertain to the audio processing system 100 according to the example of FIG. 1A and entities thereof, whereas the audio processing system 100' and entities thereof are separately described where applicable. In further examples, the audio processing system 100 or the audio processing system 100' may include further entities and/or some entities depicted in FIGS. 1A and 1B may be omitted or combined with other entities. In particular, FIGS. 1A and 1B, as well as the subsequent FIGS. 2 to 5 serve to illustrate logical components of a respective entity and hence do not impose structural limitations concerning implementation of the respective entity but, for example, respective hardware means, respective software means or a respective combination of hardware means and software means may be applied to implement any of the logical components of an entity separately from the other logical components of that entity, to implement any sub-combination of two or more logical components of an entity, or to implement all logical components of an entity in combination.

The audio processing system 100, 100' may be implemented by one or more computing devices and the resulting widened stereo signal 115 may be provided for playback via loudspeakers of one of these devices. Typically, the audio processing system 100, 100' is implemented in a portable handheld device such as a mobile phone, a media player device, a tablet computer, a laptop computer, etc. that is also applied to play back the widened stereo signal 115 via a pair of loudspeakers provided in the device. In another example, the audio processing system 100, 100' is provided in a first device, whereas the playback of the widened stereo signal 115 is provided in a second device. In a further example, a first part of the audio processing system 100, 100' is provided in a first device, whereas a second part of the audio processing system 100, 100' and the playback of the widened stereo signal 115 is provided in a second device. In these two latter examples, the second device may comprise a portable handheld device such as a mobile phone, a media player device, a tablet computer, a laptop computer, etc. while the first device may comprise a computing device of any type, e.g. a portable handheld device, a desktop computer, a server device, etc.

Figure 2:
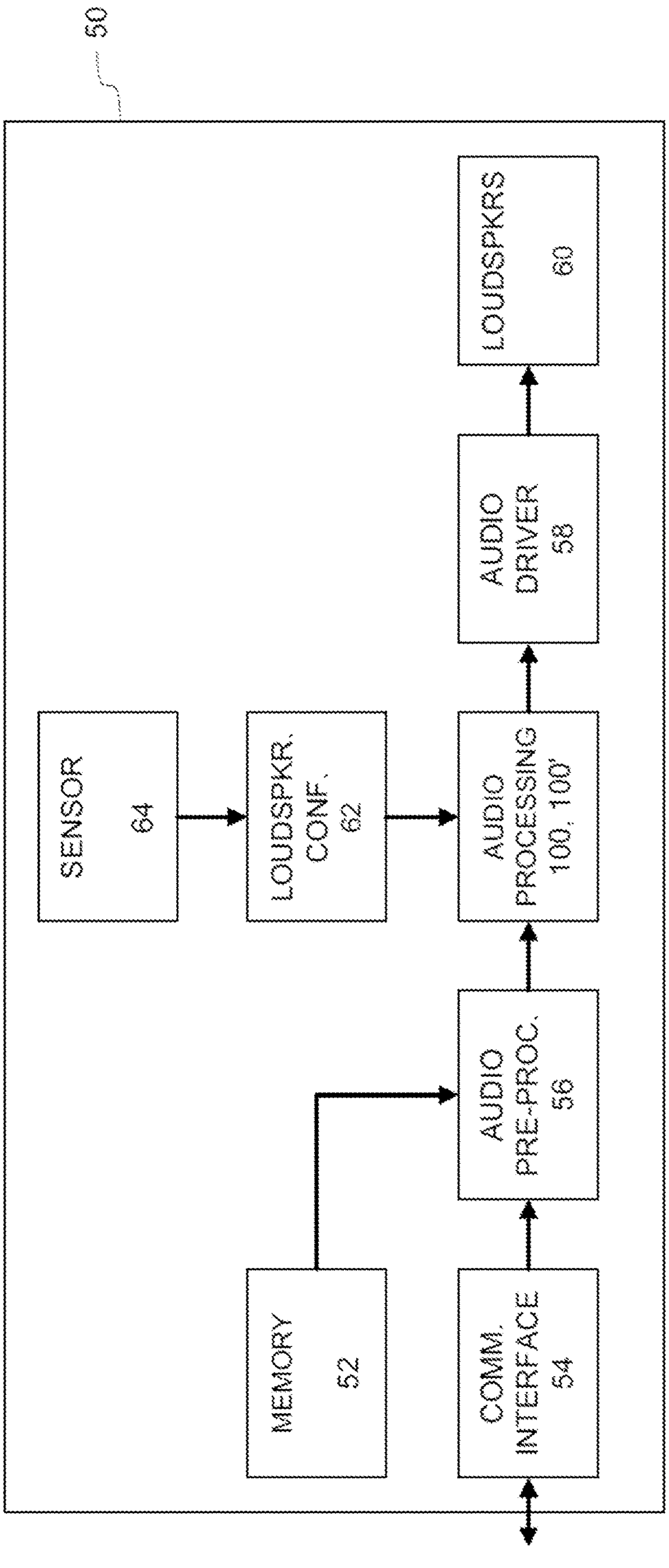
FIG. 2 illustrates a block diagram of some elements of a device that be applied to implement the audio processing system according to an example.

FIG. 2 illustrates a block diagram of some components and/or entities of a portable handheld device 50 that implements the audio processing system 100 or the audio processing system 100'. For brevity and clarity of description, in the following description it is assumed that the elements of the audio processing system 100, 100' and the playback of the resulting widened stereo signal are provided in the device 50. The device 50 further comprises a memory device 52 for storing information, e.g. the stereo signal 101, and a communication interface 54 for communicating with other devices and possibly receiving the stereo signal 101 therefrom. The device 50, optionally, further comprises an audio preprocessor 56 that may be useable for preprocessing the stereo signal 101 read from the memory 52 or received via the communication interface 54 before providing it to the audio processing system 100, 100'. The audio preprocessor 56 may, for example, carry out decoding of an audio signal stored in an encoded format into a time domain stereo audio signal 101.

Still referring to FIG. 2, the audio processing system 100, 100' may further receive the first control input that indicates the target loudspeaker configuration applied in the stereo signal 101 together with the stereo signal 101 from or via the audio preprocessor 56. The device 50 further comprises a loudspeaker configuration entity 62 that may provide the second control input that indicates output loudspeaker configuration in the device 50. The device 50 may optionally comprise a sensor 64, and the loudspeaker configuration entity 62 may derive the output loudspeaker configuration based on sensor signal received from the sensor 64. The audio processing system 100, 100' provides the widened stereo signal 115 derived therein to an audio driver 58 for playback via loudspeakers 60.

The stereo signal 101 may be received at the signal processing system 100, 100' e.g. by reading the stereo signal from a memory or from a mass storage device in the device 50. In another example, the stereo signal is obtained via communication interface (such as a network interface) from another device that stores the stereo signal in a memory or from a mass storage device provided therein. The widened stereo signal 115 may be provided for rendering by the audio playback system of the device 50. Additionally or alternatively, the widened stereo signal may be stored in the memory or the mass storage device in the device 50 and/or provided via a communication interface to another device for storage therein.

As described in the foregoing, the audio processing system 100, 100' may receive the first control input that conveys information defining the target loudspeaker configuration applied in the stereo signal 101. The target loudspeaker configuration may also be referred to as channel configuration (of the stereo signal 101). This information may be obtained, for example, from metadata that accompanies the stereo signal 101, e.g. metadata included in an audio container within which the stereo signal 101 is stored. In another example, the information defining the target loudspeaker configuration applied in the stereo signal 101 may be received (as user input) via a user interface of the device 50. The target loudspeaker configuration may be defined by indicating, for each channel of the stereo signal 101, a respective target loudspeaker position with respect to an assumed listening point. As an example, a target position for a loudspeaker may comprise a target direction, which may be defined as an angle with respect to a reference direction (e.g. a front direction). Hence, for example in case of a two-channel stereo signal the target loudspeaker configuration may be defined as respective target angles $\propto_{in}(1)$ and $\propto_{in}(2)$ with respect to the front direction for the left and right loudspeakers. The target angles $\propto_{in}(i)$ with respect to the front direction may be, alternatively, indicated by a single target angle $\propto_{in}$, which defines the absolute value of the target angles with respect to the front direction e.g. such that $\propto_{in}(1)=\propto_{in}$ and $\propto_{in}(2)=-\propto_{in}$.

In a further example, no first control input is received in the audio processing system 100, 100' and the elements of the audio processing system 100, 100' that make use of the information that defines the target loudspeaker configuration applied in the stereo signal 101 (the signal decomposer 104, the re-panner 106) apply predefined information in this regard instead. An example in this regard involves applying a fixed predefined target loudspeaker configuration. Another example involves selecting one of a plurality of predefined target loudspeaker configurations in dependence of the number of audio channels in the received stereo signal 101. Non-limiting examples in this regard include selecting, in response to a two-channel signal 101 (which is hence assumed as a two-channel stereophonic audio signal), a target loudspeaker configuration where the channels are positioned ±30 degrees with respect to the front direction and/or selecting, in response to a six-channel signal (that is hence assumed to represent a 5.1-channel surround signal), a target loudspeaker configuration where the channels are positioned at target angles $\propto_{in}$ (i) of 0 degrees, ±30 degrees and ±110 degrees with respect to the front direction and complemented with a low frequency effects (LFE) channel.

As described in the foregoing, the audio processing system 100, 100' may receive the second control input that conveys information defining the output loudspeaker configuration in the device 50. Therein, the output loudspeaker configuration may define a respective output loudspeaker position with respect to a listening position, which may indicate an assumed listening position or the actual position of the listener. The output loudspeaker configuration may define, for example, a respective output loudspeaker direction with respect to a reference direction (e.g. the front direction) for each of the output loudspeakers. In this regard, an output loudspeaker direction may be defined as a respective output loudspeaker angle $\propto_{out}$ (i) with respect to the reference direction for each of the output loudspeakers. The output loudspeaker angles $\propto_{out}$ (i) with respect to the reference direction may be, alternatively, indicated by a single output loudspeaker angle $\propto_{out}$, which e.g. in case of two loudspeakers defines the absolute value of the output loudspeaker angles $\propto_{out}$ (i) with respect to the reference direction e.g. such that $\propto_{out}$ (1)=$\propto_{out}$ and $\propto_{out}$ (2)=$-\propto_{out}$.

The output loudspeaker angles $\propto_{out}$ (i) may be directly indicated in the second control input or the second control input may define the an output loudspeaker positions as distances with respect to one or more predefined reference positions and/or reference directions, e.g. such that the a first output loudspeaker is positioned $y_1$ meters forward along a (conceptual) line that defines the front direction with respect to the listener (or with respect to the assumed listening position) and $x_1$ meters left from the front direction, and a second output loudspeaker is positioned $y_2$ meters forward along a (conceptual) line that defines the front direction with respect to the listener (or with respect to the assumed listening position) and $x_2$ meters left from the front direction. Consequently, the output loudspeaker angles $\propto_{out}$ (1) and $\propto_{out}$ (2) for the first and second output loudspeakers, respectively, may be computed as $$\propto_{out}(1)=\tan^{-1}y_1/x_1,$$

$$\propto_{out}(2)=\tan^{-1}y_2/x_2. \quad (2)$$

The second control input may convey information that defines static or dynamic output loudspeaker positions: in a scenario that applies static output loudspeaker positions, the output loudspeaker positions may be obtained and/or defined based on assumed average distance and position of a listener with respect to each of the loudspeakers of the device 50, whereas in a scenario that applies dynamic output loudspeaker positions, the output loudspeaker positions with respect to the listener may be defined and updated (e.g. at predefined time intervals) on basis of a sensor signal (e.g. a video signal from a camera).

The information that defines the output loudspeaker positions with respect to the listener's position may be applied to enable controlling the stereo widening processing such that the spatial audio image is widened beyond a range of directions spanned by the loudspeakers of the device 50 while at the same time ensuring that the focus portion of the spatial audio image (that commonly includes perceptually important audio content) is positioned in the spatial audio image in a direction that is between the loudspeakers of the device 50.

The audio processing system 100, 100' may be arranged to process the stereo signal 101 arranged into a sequence of input frames, each input frame including a respective segment of digital audio signal for each of the channels, provided as a respective time series of input samples at a predefined sampling frequency. In typical example, the audio processing system 100, 100' employs a fixed predefined frame length. In other examples, the frame length may be a selectable frame length that may be selected from a plurality of predefined frame lengths, or the frame length may be an adjustable frame length that may be selected from a predefined range of frame lengths. A frame length may be defined as number samples L included in the frame for each channel of the stereo signal 101, which at the predefined sampling frequency maps to a corresponding duration in time. As an example in this regard, the audio processing system 100, 100' may employ a fixed frame length of 20 milliseconds (ms), which at a sampling frequency of 8, 16, 32 or 48 kHz results in a frame of L=160, L=320, L=640 and L=960 samples per channel, respectively. The frames may be non-overlapping or they may be partially overlapping. These values, however, serve as non-limiting examples and frame lengths and/or sampling frequencies different from these examples may be employed instead, depending e.g. on the desired audio bandwidth, on desired framing delay and/or on available processing capacity.

Referring back to FIGS. 1A and 1B, the audio processing system 100, 100' may comprise the transform entity 102 that is arranged to convert the stereo signal 101 from time domain into a transform-domain stereo signal 103. Typically, the transform domain involves a frequency domain. In an example, the transform entity 102 employs short-time discrete Fourier transform (STFT) to convert each channel of the stereo signal 101 into a respective channel of the transform-domain stereo signal 103 using a predefined analysis window length (e.g. 20 milliseconds). In another example, the transform entity 102 employs an (analysis) complex-modulated quadrature-mirror filter (QMF) bank for time-to-frequency-domain conversion. The STFT and QMF bank serve as non-limiting examples in this regard and in further examples any suitable transform technique known in the art may be employed for creating the transform-domain stereo signal 103.

The transform entity 102 may further divide each of the channels into a plurality of frequency sub-bands, thereby resulting in the transform-domain stereo signal 103 that provides a respective time-frequency representation for each channel of the stereo signal 101. A given frequency band in a given frame may be referred to as a time-frequency tile. The number of frequency sub-bands and respective bandwidths of the frequency sub-bands may be selected e.g. in accordance with the desired frequency resolution and/or available computing power. In an example, the sub-band structure involves 24 frequency sub-bands according to the Bark scale, an equivalent rectangular band (ERB) scale or $3^{rd}$ octave band scale known in the art. In other examples, different number of frequency sub-bands that have the same or different bandwidths may be employed. A specific example in this regard is a single frequency sub-band that covers the input spectrum in its entirety or a continuous subset thereof.

A time-frequency tile that represents frequency bin b in time frame n of channel i of the transform-domain stereo signal 103 may be denoted as S(i,b,n). The transform-domain stereo signal 103, e.g. the time-frequency tiles S(i,b,n), are passed to the signal decomposer 104 for decomposition into the first signal component 105-1 and the second signal component 105-2 therein. As described in the foregoing, a plurality of consecutive frequency bins may be grouped into a frequency sub-band, thereby providing a plurality of frequency sub-bands k=0, . . . , K−1. For each frequency sub-band k, the lowest bin (i.e. a frequency bin that represents the lowest frequency in that frequency sub-band) may be denoted as $b_{k,low}$ and the highest bin (i.e. a frequency bin that represents the highest frequency in that frequency sub-band) may be denoted as $b_{k,high}$.

Referring back to FIGS. 1A and 1B, the audio processing system 100, 100' may comprise the signal decomposer 104 that is arranged to derive, based on the transform-domain stereo signal 103, the first signal component 105-1 and the second signal component 105-2. In the following, the first signal component 105-1 is referred to as a signal component that represents the focus portion of the spatial audio image and the second signal component 105-2 is referred to a signal component that represents the non-focus portion of the spatial audio image. The non-focus portion represents those parts of the audio image that are not represented by the focus portion and may be hence referred to as a 'peripheral' portion of the spatial audio image. Herein, the decomposition procedure does not change the number of channels and hence in the present example each of the first signal component 105-1 and the second signal component 105-2 is provided as a respective two-channel audio signal. It should be noted that the terms focus portion and non-focus portion as used in this disclosure are designations assigned to spatial sub-portions of the spatial audio image represented by the stereo signal 101, while these designation as such do not imply any specific processing to be applied (or having been applied) to the underlying stereo signal 101 or the transform-domain stereo signal 103 e.g. to actively emphasize or de-emphasize any portion of the spatial audio image represented by the stereo signal 101.

The signal decomposer 104 may derive, on basis of the transform-domain stereo signal 103, the first signal component 105 that represents those coherent sounds of the spatial audio image that are within a predefined focus range, such sounds hence constituting the focus portion of the spatial audio image. In contrast, the signal decomposer 104 may derive, on basis of the transform-domain stereo signal 103, the second signal component 105 that represents coherent sound sources or sound components of the spatial audio image that are outside the predefined focus range and all non-coherent sound sources of the spatial audio image, such sound sources or components hence constituting the non-focus portion of the spatial audio image. Hence, the signal decomposer 104 decomposes the sound field represented by the stereo signal 101 into the first signal component 105-1 that is excluded from subsequent stereo widening processing and into the second signal component 105-2 that is subsequently subjected to the stereo widening processing.

Figure 3:
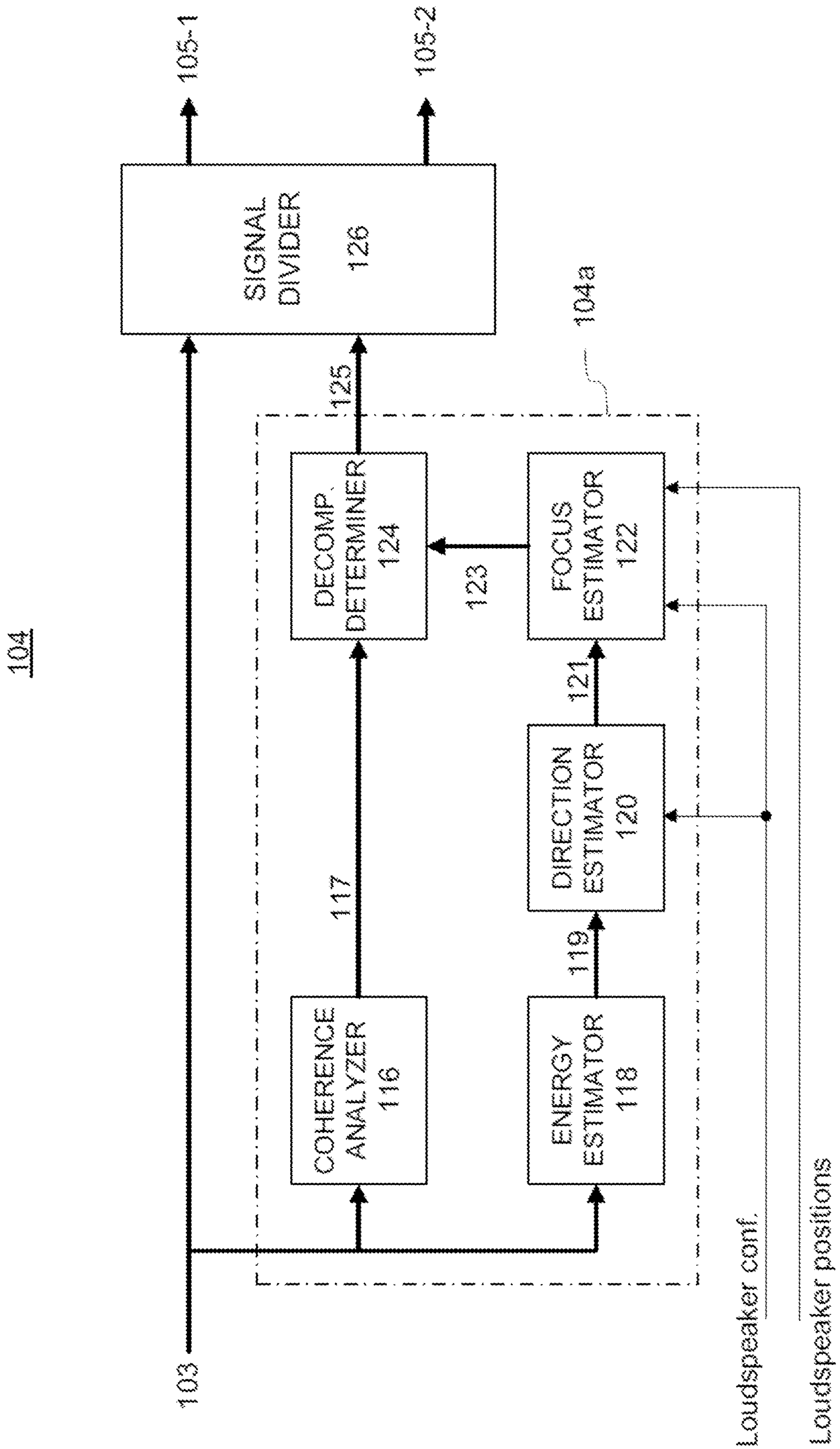
FIG. 3 illustrates a block diagram of some elements of a signal decomposer according to an example.

FIG. 3 illustrates a block diagram of some components and/or entities of the signal decomposer 104 according to an example. The signal decomposer 104 may be, conceptually, divided into a decomposition analyzer 104*a* and a signal divider 126, as illustrated in FIG. 3. In the following, entities of the signal decomposer 104 according to the example of FIG. 3 are described in more detail. In other examples, the signal decomposer 104 may include further entities and/or some entities depicted in FIG. 3 may be omitted or combined with other entities.

The signal decomposer 104 may comprise a coherence analyzer 116 for estimating, on basis of the transform-domain stereo signal 103, coherence values 117 that are descriptive of coherence between the channels of the transform-domain stereo signal 103. The coherence values 117 are provided for a decomposition coefficient determiner 124 for further processing therein.

Computation of the coherence values 117 may involve deriving a respective coherence value γ(k,n) for a plurality of frequency sub-bands k in a plurality of time frames n based on the time-frequency tiles S(i,b,n) that represent the transform domain stereo signal 103. As an example, the coherence values 117 may be computed e.g. according to the equation (3):

$$\gamma(k,n)=\frac{\sum_{b=b_{k,low}}^{b_{k,high}} Re(S^*(1,b,n)S(2,b,n))}{\sum_{b=b_{k,low}}^{b_{k,high}} (|S(1,b,n)||S(2,b,n)|)}, \quad (3)$$

where Re denotes the real part operator and * denotes the complex conjugate.

Still referring to FIG. 3, the signal decomposer 104 may comprise the energy estimator 118 for estimating energy of the transform-domain stereo signal 103 on basis of the transform-domain stereo signal 103. The energy values 119 are provided for a direction estimator 120 for direction angle estimation therein.

Computation of the energy values 119 may involve deriving a respective energy value E(i,k,n) for a plurality of frequency sub-bands k in plurality of audio channels i in a plurality of time frames n based on the time-frequency tiles S(i,b,n). As an example, the energy values E(i,k,n) may be computed e.g. according to the equation (4):

$$E(i,k,n)=\Sigma_{b_{k,low}}^{b_{k,high}}|S(i,b,n)|^2. \quad (4)$$

Still referring to FIG. 3, the signal decomposer 104 may comprise the direction estimator 120 for estimating perceivable arrival direction of the sound represented by the stereo signal 101 based on the energy values 119 in view of the indication of the target loudspeaker configuration applied in the stereo signal 101. The direction estimation may comprise computation of direction angles 121 based on the energy values in view of the target loudspeaker positions, which direction angles 121 are provided for a focus estimator 122 for further analysis therein.

The direction estimation may involve deriving a respective direction angle θ(k,n) for a plurality of frequency sub-bands k in a plurality of time frames n based on the estimated energies E(i,k,n) and the target loudspeaker positions $\propto_{in}$ (i), the direction angles θ(k,n) thereby indicating the estimated perceived arrival direction of the sound in frequency sub-bands of input frames. The direction estimation may be carried out, for example, using the tangent law according to the equations (5) and (6), where an underlying assumption is that sound sources in the sound field represented by the stereo signal 101 are arranged (to a significant extent) in their desired spatial positions using amplitude panning:

$$\theta(k,n)=\arctan\left(\tan\propto_{in}\frac{g_1-g_2}{g_1+g_2}\right), \quad (5)$$

where $$g_1=\sqrt{E(1,k,n)}$$
$$g_2=\sqrt{E(2,k,n)}, \quad (6)$$

where $\propto_{in}$ denotes the absolute value of the target angles $\propto_{in}$ (1) and $\propto_{in}$ (2) that define, respectively, the target positions of the left and right loudspeakers with respect to the front direction, which in this example are positioned symmetrically with respect to the front direction. In other examples, the target positions of the left and right loudspeakers may be positioned non-symmetrically with respect to the front direction (e.g. such that |∝_in (1)|≠|∝_in (2)|). Modification of the equation (5) such that it accounts for this aspect is a straightforward task for a person skilled in the art.

Still referring to FIG. 3, the signal decomposer 104 may comprise the focus estimator 122 for determining one or more focus coefficients 123 based on the estimated perceivable arrival direction of the sound represented by the stereo signal 101 in view of a predefined focus range within the spatial audio image, where the focus coefficients 123 are indicative of the relationship between the estimated arrival direction of the sound and the focus range. The focus range may be defined, for example, as a single angular range or as two or more angular sub-ranges in the spatial audio image. In other words, the focus range may be defined as a set of arrival directions of the sound within the spatial audio image.

The focus coefficients 123 may be derived based at least in part on the direction angles 121. The focus estimator 122 may optionally further receive the indication of the target loudspeaker configuration applied in the stereo signal 101 and/or the indication of the output loudspeaker positions in the device 50, and compute the focus coefficients 123 further in view on one or both of these pieces of information. The focus coefficients 123 are provided for the decomposition coefficient determiner 124 for further processing therein.

Typically, the one or more angular ranges define a set of arrival directions that cover a predefined portion around the center of the spatial audio image, thereby rendering the focus estimation as a 'frontness' estimation. The focus estimation may involve deriving a respective focus coefficient χ(k,n) for a plurality of frequency sub-bands k in a plurality of time frames n based on the direction angles θ(k,n), e.g. according to the equation (7):

$$\chi(k,n)=\begin{cases}1, & |\theta(k,n)|<\theta_{Th1}\\ 1-\dfrac{|\theta(k,n)|-\theta_{Th1}}{(\theta_{Th2}-\theta_{Th1})}, & \theta_{Th1}\le|\theta(k,n)|\le\theta_{Th2}\\ 0, & |\theta(k,n)|>\theta_{Th2}\end{cases}.\qquad(7)$$

In the equation (7), the first threshold value $\theta_{Th1}$ and the second threshold value $\theta_{Th2}$, where $\theta_{Th1}<\theta_{Th2}$, serve to define a primary (center) angular range (between angles $-\theta_{Th1}$ to $\theta_{Th1}$ around the front direction), a secondary angular range (from $-\theta_{Th2}$ to $-\theta_{Th1}$ and from $\theta_{Th1}$ to $\theta_{Th2}$ with respect to the front direction) and a non-focus range (outside $-\theta_{Th2}$ and $\theta_{Th2}$ with respect to the front direction). As a non-limiting example, the first and second threshold values may be set to $\theta_{Th1}=5°$ and $\theta_{Th2}=15°$, whereas in other examples different threshold values $\theta_{Th1}$ and $\theta_{Th2}$ may be applied instead. Focus estimation according to the equation (7) hence applies a focus range that includes two angular ranges (i.e. the primary angular range and the secondary angular range) and sets the focus coefficient χ(k,n) to unity in response to a sound source direction residing within the primary angular range and sets the focus coefficient χ(k,n) to zero in response to the sound source direction residing outside the focus range, whereas a predefined function of sound source direction is applied to set the focus coefficient χ(k,n) to a value between unity and zero in response to the sound source direction residing within the secondary angular range. In general, the focus coefficient χ(k,n) is set to a non-zero value in response to the sound source direction residing within the focus range and the focus coefficient χ(k,n) is set to zero value in response to the sound source direction residing outside the focus range. In an example, the equation (7) may be modified such that no secondary angular range is applied and hence only a single threshold may be applied to define the limit(s) between the focus range and the non-focus range.

Along the lines described in the foregoing, the focus range may be defined as one or more angular ranges. As an example, the focus range may include a single predefined angular range or two or more predefined angular ranges. According to another example, at least one of the focus ranges is selectable or adaptive, e.g. such that an angular range may be selected or adjusted (e.g. via selection or adjustment of one or more threshold values that define the respective angular range) in dependence of the target loudspeaker configuration applied in the stereo signal 101 and/or in dependence if the output loudspeaker positions in the device 50.

Still referring to FIG. 3, the signal decomposer 104 may comprise the decomposition coefficient determiner 124 for deriving decomposition coefficients 125 based on the coherence values 117 and the focus coefficients 123. The decomposition coefficients 125 are provided for the signal divider 126 for decomposition of the transform-domain stereo signal 103 therein.

The decomposition coefficient determination aims at providing a high value for a decomposition coefficient β(k,n) for a frequency sub-band k and frame n that exhibits relatively high coherence between the channels of the stereo signal 101 and that conveys a directional sound component that is within the focus portion of the spatial audio image (see description of the focus estimator 122 in the foregoing). In this regard, the decomposition coefficient determination may involve deriving a respective decomposition coefficient β(k,n) for a plurality of frequency sub-bands k in a plurality of time frames n based on the respective coherence value γ(k,n) and the respective focus coefficient χ(k,n) e.g. according to the equation (8):

$$\beta(k,n)=\gamma(k,n)\chi(k,n).\qquad(8)$$

In an example, the decomposition coefficients β(k,n) may be applied as such as the decomposition coefficients 125 that are provided for the signal divider 126 for decomposition of the transform-domain stereo signal 103 therein. In another example, energy-based temporal smoothing is applied to the decomposition coefficient β(k,n) obtained from the equation (8) in order to derive smoothed decomposition coefficients β'(k,n), which may be provided for the signal divider 126 to be applied for decomposition of the transform-domain stereo signal 103 therein. Smoothing of the decomposition coefficients results in slower variations over time in sub-portions of the spatial audio image assigned to the first signal component 105-1 and the second signal component 105-2, which may enable improved perceivable quality in the resulting widened stereo signal 115 via avoidance of small-scale fluctuances in the spatial audio image therein. A weighting that provides the energy-based temporal smoothing may be provided, for example, according to the equation (9a):

$$\beta'(k,n)=A(k,n)/B(k,n), \tag{9a}$$

where $$A(k,n)=aE(k,n)\beta(k,n)+bA(k,n-1)$$
$$B(k,n)=aE(k,n)+bB(k,n-1),\text{ and} \tag{9b}$$

where E(k,n) denotes the total energy of the transform-domain stereo signal 103 for a frequency sub-band k in time frames n (derivable e.g. based on the energies E(i,k,n) derived using the equation (4)) and a and b (where, preferably, a+b=1) denote predefined weighting factors. As a non-limiting example, values a=0.2 and b=0.8 may be applied, whereas in other examples other values in the range from 0 to 1 may be applied instead.

Still referring to FIG. 3, the signal decomposer 104 may comprise the signal divider 126 for deriving, based on the transform-domain stereo signal 103, the first signal component 105-1 that represents the focus portion of the spatial audio image and the second signal component 105-2 that represents the non-focus portion (e.g. a 'peripheral' portion) of the spatial audio image. The decomposition of the transform-domain stereo signal 103 is carried out based on the decomposition coefficients 125. As an example, the signal decomposition may be carried out for a plurality of frequency sub-bands k in a plurality of channels i in a plurality of time frames n based on the time-frequency tiles S(i,b,n), according the equation (10a):

$$S_{sw}(i,b,n)=S(i,b,n)(1-\beta(b,n))^p$$
$$S_{dr}(i,b,n)=S(i,b,n)\beta(b,n)^p, \tag{10a}$$

where $S_{dr}(i,b,n)$ denotes frequency bin b in time frame n of channel i of the first signal component 105-1, $S_{sw}(i,b,n)$ denotes frequency bin b in time frame n of channel i of the second signal component 105-2, and p denotes predefined constant parameter (e.g. p=0.5). In general case, the scaling coefficient $\beta(b,n)^p$ in the equation (9) may be replaced with another scaling coefficient that increases with increasing value of the decomposition coefficient β(b,n) (and decreases with decreasing value of the decomposition coefficient β(b, n)) and the scaling coefficient $(1-\beta(b,n))^p$ in the equation (10a) may be replaced with another scaling coefficient that decreases with increasing value of the decomposition coefficient β(b,n) (and increases with decreasing value of the decomposition coefficient β(b,n)).

In another example, the signal decomposition may be carried out for a plurality of frequency sub-bands k in a plurality of channels i in a plurality of time frames n based on the time-frequency tiles S(i,b,n), according the equation (10b):

$$S_{sw}(i,b,n)=\begin{cases}S(i,b,n), & \beta(b,n)\le\beta_{Th}\\ 0, & \beta(b,n)>\beta_{Th}\end{cases}$$
$$S_{dr}(i,b,n)=\begin{cases}0, & \beta(b,n)\le\beta_{Th}\\ S(i,b,n), & \beta(b,n)>\beta_{Th}\end{cases}, \tag{10b}$$

wherein $\beta_{Th}$ denotes a predefined threshold value that has value in the range from 0 to 1, e.g. $\beta_{Th}=0.5$. If applying the equation (10b) the temporal smoothing of the decomposition coefficients 125 described in the foregoing and/or temporal smoothing of the resulting signal components $S_{sw}(i,b,n)$ and $S_{dr}(i,b,n)$ may be advantageous for improved perceivable quality of the resulting widened stereo signal 115.

The decomposition coefficients β(k,n) according to the equation (8) are derived on time-frequency tile basis, whereas the equations (10a) and (10b) apply the decomposition coefficients β(b,n) on frequency bin basis. In this regard, the decomposition coefficients β(k,n) derived for a frequency sub-band k may be applied for each frequency bin b within the frequency sub-band k.

Consequently, the transform-domain stereo signal 103 is divided, in each time-frequency tile, into the first signal component 105-1 that represents sound components positioned in the focus portion of the spatial audio image represented by the stereo signal 101 and into the second signal component 105-2 that represents sound components positioned outside the focus portion of the spatial audio image represented by the stereo signal 101. The first signal component 105-1 is subsequently provided for playback without applying stereo widening thereto, whereas the second signal component 105-2 is subsequently provided for playback after being subjected to stereo widening.

Referring back to FIGS. 1A and 1B, the audio processing system 100, 100' may comprise the re-panner 106 that is arranged to generate a modified first signal component 107 on basis of the first signal component 105-1, wherein one or more sound sources represented by the first signal component 105-1 are repositioned in the spatial audio image in dependence of the target loudspeaker configuration and/or in dependence of the output loudspeaker positions of the device 50. In an example, the re-panner 106 is arranged to re-position sound sources conveyed in the first signal component 105-1 in dependence of differences between the target loudspeaker configuration and the output loudspeaker configuration, e.g. in dependence of differences in the target loudspeaker positions and the output loudspeaker positions in the device 50. In this regard, we may consider an example where two output loudspeakers in the device 50 are positioned at output angles $\propto_{out}(i)=\pm15$ degrees when the device is at an average distance from a user. We may further assume that in the target loudspeaker configuration the loudspeakers are positioned at target angles $\propto_{in}(i)=\pm30$ degrees. Consequently, an audio source in the spatial audio image represented by the stereo signal 101 positioned e.g. in a 10 degree direction angle with respect to the front direction would be perceived at a position that is in a 5 degree direction angle with respect to the front direction when reproduced by the output loudspeakers of the device 50. The re-positioning of the sound sources by the re-panner 106 serves to compensate for this deviation in the perceivable arrival of direction due to mismatch between the loudspeaker positions according to the target loudspeaker configuration and the output loudspeaker positions in the device 50.

Figure 4:
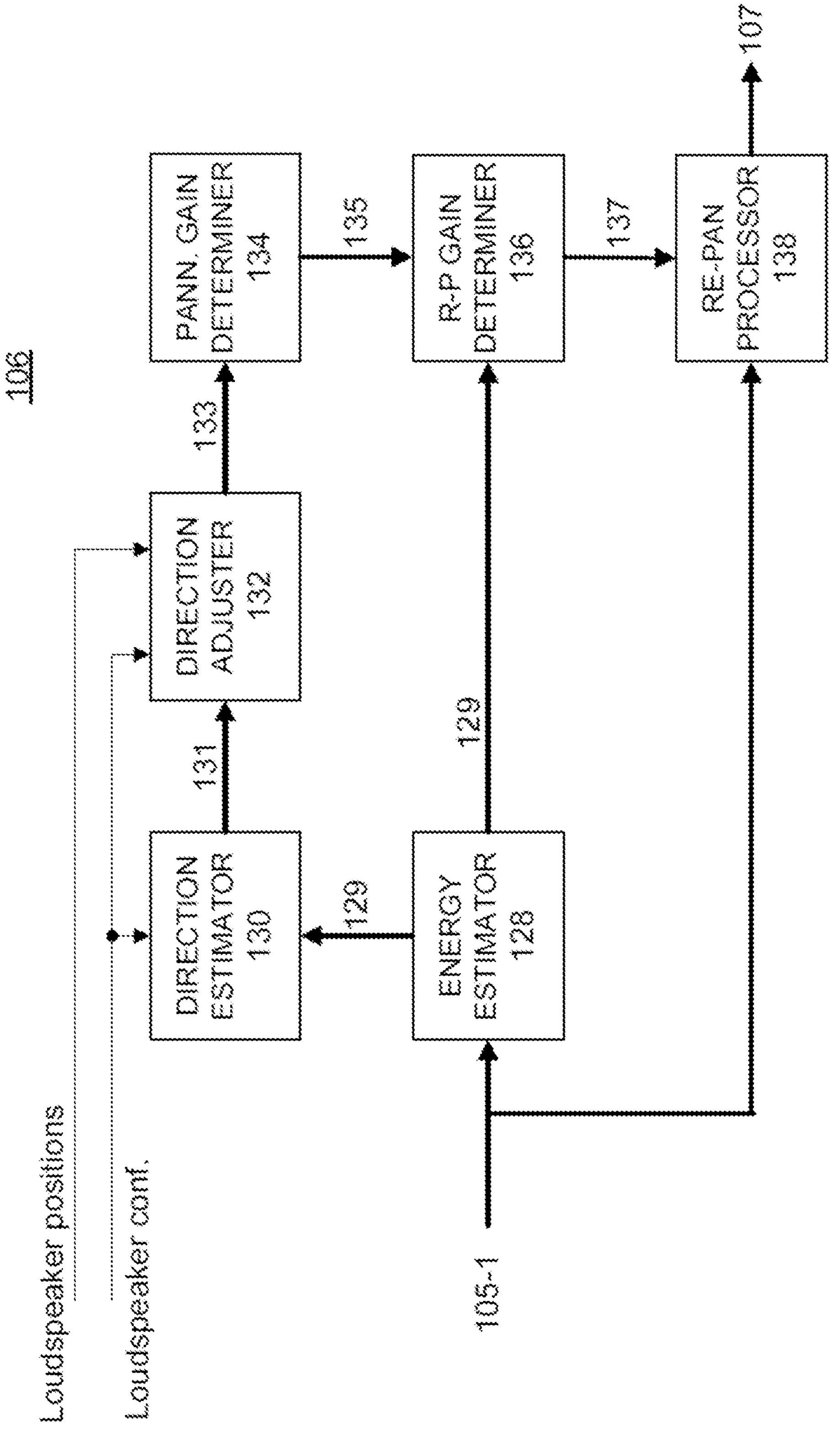
FIG. 4 illustrates a block diagram of some elements of a re-panner according to an example.

FIG. 4 illustrates a block diagram of some components and/or entities of the re-panner 106 according to an example. In the following, entities of the re-panner 106 according to the example of FIG. 4 are described in more detail. In other examples, the re-panner 106 may include further entities and/or some entities depicted in FIG. 4 may be omitted or combined with other entities.

The re-panner 106 may comprise an energy estimator 128 for estimating energy of the first signal component 105-1. The energy values 129 are provided for a direction estimator 130 and for a re-panning gain determiner 136 for further processing therein. The energy value computation may involve deriving a respective energy value $E_{dr}(i,k,n)$ for a plurality of frequency sub-bands k in plurality of audio channels i in a plurality of time frames n based on the time-frequency tiles $S_{dr}(i,b,n)$. As an example, the energy values $E_{dr}(i,k,n)$ may be computed e.g. according to the equation (11):

$$E_{dr}(i,k,n)=\Sigma_{b_{k,low}}^{b_{k,high}}S_{dr}|(i,b,n)|^2.$$

In another example, the energy values 119 computed in the energy estimator 118 (e.g. according to the equation (4)) may be re-used in the re-panner 106, thereby dispensing with a dedicated energy estimator 128 in the re-panner 106. Even though the energy estimator 118 of the signal decomposer 104 estimates the energy values 119 based on the transform-domain stereo signal 103 instead of the first signal component 105-1, the energy values 119 enable correct operation of the direction estimator 130 and the re-panning gain determiner 136.

Still referring to FIG. 4, the re-panner 106 may comprise the direction estimator 130 for estimating perceivable arrival direction of the sound represented by the first signal component 105-1 based on the energy values 129 in view of the target loudspeaker configuration applied in the stereo signal 101. The direction estimation may comprise computation of direction angles 131 based on the energy values 129 in view of the target loudspeaker positions, which direction angles 131 are provided for a direction adjuster 132 for further processing therein.

The direction estimation may involve deriving a respective direction angle $\theta_{dr}(k,n)$ for a plurality of frequency sub-bands k in a plurality of time frames n based on the estimated energies $E_{dr}(i,k,n)$ and the target loudspeaker positions $\propto_{in}$ (i), the direction angles $\theta_{dr}(k,n)$ thereby indicating the estimated perceived arrival direction of the sound in frequency sub-bands of first signal component 105-1. The direction estimation may be carried out, for example, according to the equations (12) and (13):

$$\theta_{dr}(k,n) = \arctan\left(\tan \propto_{in} \frac{g_{1,dr} - g_{2,dr}}{g_{1,dr} + g_{2,dr}}\right), \quad (12)$$

where $$g_{1,dr} = \sqrt{E_{dr}(1,k,n)} \quad (13)$$
$$g_{2,dr} = \sqrt{E_{dr}(2,k,n)}.$$

In another example, the direction angles 121 computed in the energy estimator 128 (e.g. according to the equations (5) and (6)) may be re-used in the re-panner 106, thereby dispensing with a dedicated direction estimator 130 in the re-panner 106. Even though the direction estimator 120 of the signal decomposer 104 estimates the direction angles 121 based on the energy values 119 derived from the transform-domain stereo signal 103 instead of the first signal component 105-1, the sound source positions are the same or substantially the same and hence the direction angles 121 enable correct operation of the direction adjuster 132.

Still referring to FIG. 4, the re-panner 106 may comprise the direction adjuster 132 for modifying the estimated perceivable arrival direction of the sound represented by the first signal component 105-1. The direction adjuster 132 may derive modified direction angles 133 based on the direction angles 131 in dependence of the indication of the target loudspeaker configuration applied in the stereo signal 101 and in dependence of the indication of the output loudspeaker positions in the device 50. The modified direction angles 133 are provided for a panning gain determiner 134 for further processing therein.

The direction adjustment may comprise mapping the direction angles 131 into respective modified direction angles 133 that represent adjusted perceivable arrival direction of the sound in view of the output loudspeaker positions of the device 50. The target loudspeaker configuration may be indicated by the target angles $\propto_{in}$ (i) and the output loudspeaker positions of the device 50 may be indicated by the respective output loudspeaker angles $\propto_{out}$ (i). According to a non-limiting example, assuming symmetrical target positions for the channels of the stereo signal 101 with respect to the front direction (i.e. target angles $\propto_{in}$) and symmetrical output loudspeaker positions of the device 50 with respect to the front direction (i.e. output loudspeaker angles $\propto_{out}$), the mapping between the direction angles 131 and the modified direction angles 132 may be provided by determining a mapping coefficient μ according to the equation (14):

$$\mu=\propto_{in}/\propto_{out}, \quad (14)$$

which may be applied for deriving a respective modified direction angle θ'(k,n) for a plurality of frequency sub-bands k in a plurality of time frames n e.g. according to the equation (15):

$$\theta'(k,n)=\mu\theta(k,n). \quad (15)$$

The example above assumes that both the target angles $\propto_{in}$ (i) and the output loudspeaker angles $\propto_{out}$ (i) are positioned symmetrically with respect to the front direction. According to another non-limiting example, the mapping between direction angles 131 and the modified direction angles 132 may be provided according to the equations (16) and (17):

$$\begin{aligned} \propto_{out,c} &= (\propto_{out}(1) + \propto_{out}(2))/2 \\ \propto_{out,hr} &= (\propto_{out}(1) - \propto_{out}(2))/2, \text{ and} \\ \propto_{in,hr} &= (\propto_{in}(1) - \propto_{in}(2))/2 \end{aligned} \quad (16)$$

$$\theta'(k,n) = (\propto_{in,hr} / \propto_{out,hr})(\theta(k,n) - \propto_{out,c}). \quad (17)$$

where $\propto_{out,c}$ denotes an angle that defines the center position (i.e. direction) between the left and right output loudspeakers, $\propto_{out,hr}$ denotes an angle that defines a half range position (i.e. direction) for the left and right output loudspeakers, and $\propto_{in,hr}$ denotes an angle that defines a half range position (i.e. direction) for the left and right target loudspeaker positions. The approach according to the equations (16) and (17) applies to a general case where the left and right target loudspeaker positions $\propto_{in}$ (i) are arranged symmetrically with respect to the front direction (or another reference direction) and the left and right output loudspeaker positions $\propto_{out}$ (i) are arranged either symmetrically or asymmetrically with respect to the front direction (or another reference direction).

The determination of the mapping coefficient μ and derivation of the modified direction angles θ'(k,n) according to the equations (14) and (15) serves as a non-limiting example and a different procedure for deriving the modified direction angles 133 may be applied instead.

Still referring to FIG. 4, the re-panner 106 may comprise the panning gain determiner 134 for computing a set of panning gains 135 on basis of the modified direction angles 133. The panning gain determination may comprise, for example, using vector base amplitude panning (VBAP) technique known in the art to compute a respective panning gain g'(i,k,n) for a plurality of frequency sub-bands k in plurality of audio channels i in a plurality of time frames n based on the modified direction angles θ'(k,n). A non-limiting example of an applicable VBAP technique is described in V. Pulkki, "Virtual source positioning using vector base amplitude panning", J. Audio Eng. Soc., vol. 45, pp. 456-466, June 1997.

Still referring to FIG. 4, the re-panner 106 may comprise the re-panning gain determiner 136 for deriving re-panning gains 137 based on the panning gains 135 and the energy values 129. The re-panning gains 137 are provided for a re-panning processor 138 for derivation of a modified first signal component 107 therein.

The re-panning gain determination procedure may comprise computing a respective total energy $E_s(k,n)$ for a plurality of frequency sub-bands k in a plurality of time frames n e.g. according to the equation (18):

$$E_s(k,n)=\Sigma_i E_{dr}(i,k,n). \quad (18)$$

The re-panning gain determination may further comprise computing a respective target energy $E_t(i,k,n)$ for a plurality of frequency sub-bands k in plurality of audio channels i in a plurality of time frames n based on the total energies $E_s(k,n)$ and the panning gains g'(i,k,n), e.g. according to the equation (19):

$$E_t(i,k,n)=g'(i,k,n)^2 E_s(k,n). \quad (19)$$

The target energies $E_t(i,k,n)$ may be applied with the energy values $E_{dr}(i,k,n)$ to derive a respective re-panning gain $g_r(i,k,n)$ for a plurality of frequency sub-bands k in plurality of audio channels i in a plurality of time frames n, e.g. according to the equation (20):

$$g_r(i,k,n)=\sqrt{E_t(i,k,n)/E_{dr}(i,k,n)}. \quad (20)$$

In an example, the re-panning gains $g_r(i,k,n)$ obtained from the equation (20) may be applied as such as the re-panning gains 137 that are provided for the re-panning processor 138 for derivation of the modified first signal component 107 therein. In another example, energy-based temporal smoothing is applied to the re-panning gains $g_r(i,k,n)$ obtained from the equation (20) in order to derive smoothed re-panning gains $g'_r(i,k,n)$, which may be provided for the re-panning processor 138 to be applied for re-panning therein. Smoothing of the re-panning gains $g_r(i,k,n)$ results in slower variations over time within the sub-portion of the spatial audio image assigned to the first signal component 105-1, which may enable improved perceivable quality in the resulting widened stereo signal 115 via avoidance of small-scale fluctuances in the respective portion of the widened spatial audio image therein.

Still referring to FIG. 4, the re-panner 106 may comprise the re-panning processor 138 for deriving the modified first signal component 107 on basis of the first signal component 105-1 in dependence of the re-panning gains 137. In the resulting modified first signal component 107 the sound sources in the focus portion of the spatial audio image are repositioned (i.e. re-panned) in accordance with the modified direction angles 132 derived in the direction adjuster 132 to account for (possible) differences between the target loudspeaker configuration applied in the stereo signal 101 and the output loudspeaker positions in the device 50, thereby keeping the focus portion in its intended position within the spatial audio image. The modified first signal component 107 is provided for an inverse transform entity 108-1 for conversion from the transform domain to the time domain therein.

The procedure for deriving the modified first signal component 107 may comprise deriving a respective time-frequency tile $S_{dr,rp}(i,b,n)$ for a plurality of frequency bins b in plurality of audio channels i in a plurality of time frames n based on a corresponding time-frequency tiles $S_{dr}(i,b,n)$ of the first signal component 105-1 in dependence of the re-panning gains $g_r(i,b,n)$, e.g. according to the equation (21):

$$S_{dr,rp}(i,b,n)=g_r(i,b,n)S_{dr}(i,b,n). \quad (21)$$

The re-panning gains $g_r(i,k,n)$ according to the equation (20) are derived on time-frequency tile basis, whereas the equation (21) applies the re-panning gains $g_r(i,k,n)$ on frequency bin basis. In this regard, the re-panning gain $g_r(i,k,n)$ derived for a frequency sub-band k may be applied for each frequency bin b within the frequency sub-band k.

Referring back to FIG. 1A, the audio processing system may comprise the inverse transform entity 108-1 that is arranged to transform the modified first signal component 107 from the transform-domain (back) to the time domain, thereby providing a time-domain modified first signal component 109-1. Along similar lines, the audio processing system 100 may comprise an inverse transform entity 108-2 that is arranged to transform the second signal component 105-2 from the transform-domain (back) to the time domain, thereby providing a time-domain second signal component 109-2. Both the inverse transform entity 108-1 and the inverse transform entity 108-2 make use of an applicable inverse transform that inverts the time-to-transform-domain conversion carried out in the transform entity 102. As non-limiting examples in this regard, the inverse transform entities 108-1, 108-2 may apply an inverse STFT or a (synthesis) QMF bank to provide the inverse transform. The resulting time-domain modified first signal component 109-1 may be denoted as $s_{dr}(i,m)$ and the resulting time-domain second signal component 109-2 may be denoted as $s_{sw}(i,m)$, where i denotes the channel and m denotes a time index (i.e. a sample index).

Referring back to FIG. 1B, as described in the foregoing, in the audio processing system 100' the inverse transform entities 108-1, 108-2 are omitted, and the modified first signal component 107 is provided as a transform-domain signal to the (optional) delay element 110' and the transform-domain second signal component 105-2 is provided as a transform-domain signal to the stereo widening processor 112'.

Referring back to FIG. 1A, the audio processing system 100 may comprise the stereo widening processor 112 that is arranged to generate, on basis of the second signal component 109-2, the modified second signal component 113 where the width of a spatial audio image is extended from that represented by the second signal component 109-2. The stereo widening processor 112 may apply any stereo widening technique known in the art to extend the width of the spatial audio image. In an example, the stereo widening processor 112 processes the second signal component $s_{sw}(i,m)$ into the modified second signal component $s'_{sw}(i,m)$. where the second signal component $s_{sw}(i,m)$ and the modified second signal component $s'_{sw}(i,m)$ are respective time-domain signals.

Figure 5:
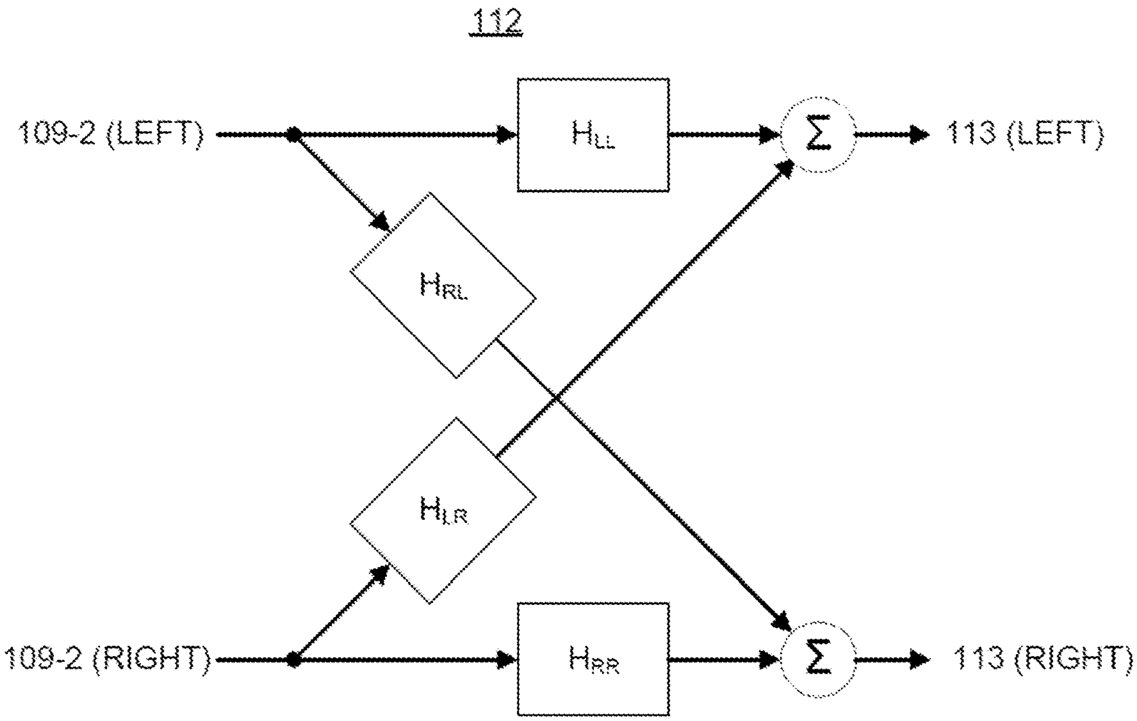
FIG. 5 illustrates a block diagram of some elements of a stereo widening processor according to an example.

FIG. 5 illustrates a block diagram of some components and/or entities of the stereo widening processor 112 according to a non-limiting example. In this example, four filters $H_{LL}$, $H_{RL}$, $H_{LR}$ and $H_{RR}$ are applied to create the widened spatial audio image: the left channel of the modified second signal component 113 is created as a sum of the left channel of the second signal component 109-2 filtered by the filter $H_{LL}$ and the right channel of the second signal component 109-2 filtered by the filter $H_{LR}$, whereas the right channel of the modified second signal component 113 is created as a sum of the left channel of the second signal component 109-2 filtered by the filter $H_{RL}$ and the right channel of the second signal component 109-2 filtered by the filter $H_{RR}$. In the example of FIG. 5, the stereo widening procedure is carried out on basis of the time-domain second signal component 109-2. In other examples, the stereo widening procedure (e.g. one that makes use of the filtering structure of FIG. 5) may be carried out in the transform domain. In this alternative example, the order of the inverse transform entity 108-2 and the stereo widening processor 112 is changed.

In an example, the stereo widening processor 112 may be provided with a dedicated set of filters $H_{LL}$, $H_{RL}$, $H_{LR}$ and $H_{RR}$ that is designed to produce a desired extent of stereo widening for a predefined pair of the target loudspeaker configuration and output loudspeaker positions in the device 50. In another example, the stereo widening processor 112 may be provided with a plurality of sets of filters $H_{LL}$, $H_{RL}$, $H_{LR}$ and $H_{RR}$, each set designed to produce a desired extent of stereo widening for a respective pair of the target loudspeaker configuration and output loudspeaker positions in the device 50. In the latter example, the set of filters is selected in dependence of the indicated target loudspeaker configuration and the output loudspeaker positions in the device 50. In a scenario with a plurality of sets of filters, the stereo widening processor 112 may dynamically switch been sets of filters e.g. in response to a change in the indicated output loudspeaker positions (e.g. a change in the user's position with respect to the output loudspeakers 50). There are various ways for designing a set of filters $H_{LL}$, $H_{RL}$, $H_{LR}$ and $H_{RR}$. In this regard, further information is available for example in O. Kirkeby, P. A. Nelson, H. Hamada and F. Orduna-Bustamante, "Fast deconvolution of multichannel systems using regularization," IEEE Transactions on Speech and Audio Processing, vol. 6, no. 2, pp. 189-194, 1998 and in S. Bharitkar and C. Kyriakakis, "Immersive Audio Signal Processing", ch. 4, Springer, 2006.

Referring back to FIG. 1B, as described in the foregoing, in the audio processing system 100' the stereo widening processor 112' is arranged to generate, on basis of the transform-domain second signal component 105-2, the (transform-domain) modified second signal component 113' for provision to the signal combiner 114'. The spatial audio processor 112' may make use of the STFT, whereas other characteristics of operation of the spatial audio processor 112' may be similar those described in the foregoing in context of the (time-domain) spatial audio processor 112, with the exception that the input signal to the spatial audio processor 112', the processing in the spatial audio processor 112' and the output signal of the spatial audio processor 112' are respective transform-domain signals.

Referring back to FIG. 1A, the audio processing system 100 may comprise the delay element 110 that is arranged to delay the modified first signal component 109-1 by a predefined time delay, thereby creating a delayed first signal component 111. The time delay is selected such that it matches or substantially matches the delay resulting from stereo widening processing applied in the stereo widening processor 112, thereby keeping the delayed first signal component 111 temporally aligned with the modified second signal component 113. In an example, the delay element 110 processes the modified first signal component $s_{dr}$(i,m) into the delayed first signal component $s'_{dr}$(i,m). In the example of FIG. 1A, the time delay is applied in the time domain. In alternative example, the order of the inverse transform entity 108-1 and the delay element 110 may be changed, thereby resulting in application of the predefined time delay in the transform domain.

Referring back to FIG. 1B, as described in the foregoing, in the audio processing system 100' the delay element 110' is optional and, if included, it is arranged to operate in the transform-domain, in other words to apply the predefined time delay to the modified first signal component 107 to create the delayed modified first signal component 111' in the transform-domain for provision to the combiner signal 114' as a transform-domain signal.

Referring back to FIG. 1A, the audio processing system 100 may comprise the signal combiner 114 that is arranged to combine the delayed first signal component 111 and the modified second signal component 113 into the widened stereo signal 115, where the width of spatial audio image is partially extended from that of the stereo signal 101. As examples in this regard, the widened stereo signal 115 may be derived as a sum, as an average or as another linear combination of the delayed first signal component 111 and the modified second signal component 113, e.g. according to the equation (22):

$$s_{out}(i,m)=s'_{sw}(i,m)+s'_{dr}(i,m), \tag{22}$$

where $s_{out}$(i,m) denotes the widened stereo signal 115.

Referring back to FIG. 1B, as described in the foregoing, in the audio processing system 100' the signal combiner 114' is arranged to operate in the transform-domain, in other words to combine the (transform-domain) delayed modified first signal component 113' with the (transform-domain) modified second signal component 113' into the (transform-domain) widened stereo signal 115' for provision to the inverse transform entity 108'. The inverse transform entity 108' is arranged to convert the (transform-domain) widened stereo signal 115' from the transform domain into the (time-domain) widened stereo signal 115. The transform entity 108' may carry out the conversion in a similar manner as described in the foregoing in context of the transform entities 108-1, 108-2.

Each of the exemplifying audio processing systems 100, 100' described in the foregoing via a number of examples may further varied in a number of ways. In the following, non-limiting examples in this regard are described.

In the foregoing, description of elements of the audio processing systems 100, 100' refer to processing of relevant audio signals in a plurality of frequency sub-bands k. In an example, the processing of the audio signal in each element of the audio processing systems 100, 100' is carried out across (all) frequency sub-bands k. In other examples, in at least some elements of the audio processing systems 100, 100' the processing of the audio signal is carried out in a limited number of frequency sub-bands k. As examples in this regard, the processing in a certain element of the audio processing system 100, 100' may be carried out for a predefined number of lowest frequency sub-bands k, for a predefined number of highest frequency sub-bands k, or for a predefined subset of frequency sub-bands k in the middle of the frequency range such that a first predefined number of lowest frequency sub-bands k and a second predefined number of highest frequency sub-bands k is excluded from the processing. The frequency sub-bands k excluded from the processing (e.g. ones at the lower end of the frequency range and/or ones at the higher end of the frequency range) may be passed unmodified from an input to an output of the respective element. As a non-limiting example concerning elements of the audio processing systems 100, 100' where the processing may be carried out only for a limited subset of frequency sub-bands k, involves one or both of the re-panner 116 and the stereo widening processor 112, 112', which may only process the respective input signal in a respective desired sub-range of frequencies, e.g. in a predefined number of lowest frequency sub-bands k or in a predefined subset of frequency sub-bands k in the middle of the frequency range.

In another example, as already described in the foregoing, the input audio signal 101 may comprise a multi-channel signal different from a two-channel stereophonic audio signal, e.g. surround signal. For example in case the input audio signal 101 comprises a 5.1-channel surround signal, the audio processing technique(s) described in the foregoing with references to the left and right channels of the stereo signal 101 may be applied to the front left and front right channels of the 5.1-channel surround signal to derive the left and right channels of the output audio signal 115. The other channels of the 5.1-channel surround signal may be processed e.g. such that the center channel of the 5.1-channels surround signal scaled by a predefined gain factor (e.g. by one having value $\sqrt{0.5}$) is added to the left and right channels of the output audio signal 115 obtained from the audio processing system 100, 100', whereas the rear left and right channels of the 5.1-channel surround signal may be processed using a conventional stereo widening technique that makes use of target response(s) that correspond(s) to respective target positions of the left and right rear loudspeakers (e.g. ±110 degrees with respect to the front direction). The LFE channel of the 5.1-channel surround signal may be added to the center signal of the 5.1-channel surround signal prior to adding the scaled version thereof to the left and right channels of the output audio signal 115.

In another example, additionally or alternatively, the audio processing system 100, 100' may enable adjusting balance between the contribution from the first signal component 105-1 and the second signal component 105-2 in the resulting widened stereo signal 115. This may be provided, for example, by applying respective different scaling gains to the first signal component 105-1 (or a derivative thereof) and to the second signal component 105-2 (or a derivative thereof). In this regard, respective scaling gains may be applied e.g. in the signal combiner 114, 114' to scale the signal components derived from the first and second signal components 105-1, 105-2 accordingly, or in the signal divider 126 to scale the first and second signal components 105-1, 105-2 accordingly. A single respective scaling gain may be defined for scaling the first and second signal components 105-1, 105-2 (or a respective derivative thereof) across all frequency sub-bands or in predefined sub-set of frequency sub-bands. Alternatively or additionally, different scaling gains may be applied across the frequency sub-bands, thereby enabling adjustment of the balance between the contribution from the first and second signal components 105-1, 105-2 only on some of the frequency sub-bands and/or adjusting the balance differently at different frequency sub-bands.

In a further example, alternatively or additionally, the audio processing system 100, 100' may enable scaling of one or both of the first signal component 105-1 and the second signal component 105-2 (or respective derivatives thereof) independently of each other, thereby enabling equalization (across frequency sub-bands) for one or both of the first and second signal components. This may be provided, for example, by applying respective equalization gains to the first signal component 105-1 (or a derivative thereof) and to the second signal component 105-2 (or a derivative thereof). A dedicated equalization gain may be defined for one or more frequency sub-bands for the first signal component 105-1 and/or for the second signal component 105-2. In this regard, for each of the first and second signal components 105-1, 105-2, a respective equalization gain may be applied e.g. in the signal divider 126 or in the signal combiner 114, 114' to scale a respective frequency sub-band of the respective one of the first and second signal components 105-1, 105-2 (or a respective derivative thereof). For a certain frequency sub-band, the equalization gain may be the same for both the first and second signal components 105-1, 105-2 or different equalization gains be applied for the first and second signal component 105-1, 105-2.

In a further example, additionally or alternatively, the audio processing system 100, 100' may receive a sensor signal that enables deriving information that is indicative of the distance between the output loudspeakers and the listener's ears, which distance may be applied to derive or adjust the information that is indicative of the output loudspeaker configuration (e.g. the second control input) accordingly. As an example, the sensor signal may originate from a camera serving as the sensor 64, whereas the loudspeaker configuration entity 62 may derive, accordingly, the second control input that indicates output loudspeaker configuration with respect to the listening position based on the sensor signal from the camera and possibly further based on information on the positions of the loudspeakers 60 in the device 50 with respect to the position of the camera. With this information the loudspeaker configuration entity 62 may derive whether the user is holding the device 50 close to his/her face (e.g. closer than 30 cm) at a normal or typical distance (e.g. from 30 to 40 cm) or further away (e.g. farther away than 40 cm). In response to detecting the device to be close to the user's face, the loudspeaker configuration entity 62 may adjust the output loudspeaker positions, e.g. the output loudspeaker angles $\propto_{out}(i)$, accordingly to indicate a larger-than-normal angle between the output loudspeakers due to the user being closer to the device 50, whereas in response to detecting the device to be further away from the user's face, the loudspeaker configuration entity 62 may adjust the output loudspeaker positions, e.g. the output loudspeaker angles $\propto_{out}(i)$, accordingly to indicate a smaller-than-normal angle between the output loudspeakers due to the user being further away from the device 50. The updated output loudspeaker configuration may affect e.g. the operation of the signal decomposer 104 and/or the re-panner 106.

Operation of the audio processing system 100, 100' described in the foregoing via multiple examples enables adaptively decomposing the stereo signal 101 into the first signal component 105-1 that represents the focus portion of the spatial audio image and that is provided for playback without application of stereo widening thereto and into the second signal component 105-2 that represents peripheral (non-focus) portion of the spatial audio image that is subjected to the stereo widening processing. In particular, since the decomposition is carried out on basis of audio content conveyed by the stereo signal 101 on frame by frame basis, the audio processing system 100, 100' enables both adaptation for relatively static spatial audio images of different characteristics and adaptation to changes in the spatial audio image over time.

The disclosed stereo widening technique that relies on excluding coherent sound sources within the focus portion of the spatial audio image from the stereo widening processing and applies the stereo widening processing predominantly to coherent sounds that are outside the focus portion and to non-coherent sounds (such as ambience) enables improved timbre and engagement and reduced 'coloration' of sounds that are within the focus portion while still providing a large extent of perceivable stereo widening. Moreover, the disclosed stereo widening technique that excludes the coherent sounds within the focus portion from the stereo widening processing allows for a higher dynamic range of the widened stereo signal 115 and hence enables driving the loudspeakers 50 at a higher perceivable signal levels without audible distortion in comparison to widened stereo signal produced by the stereo widening techniques known in the art.

Figure 6:
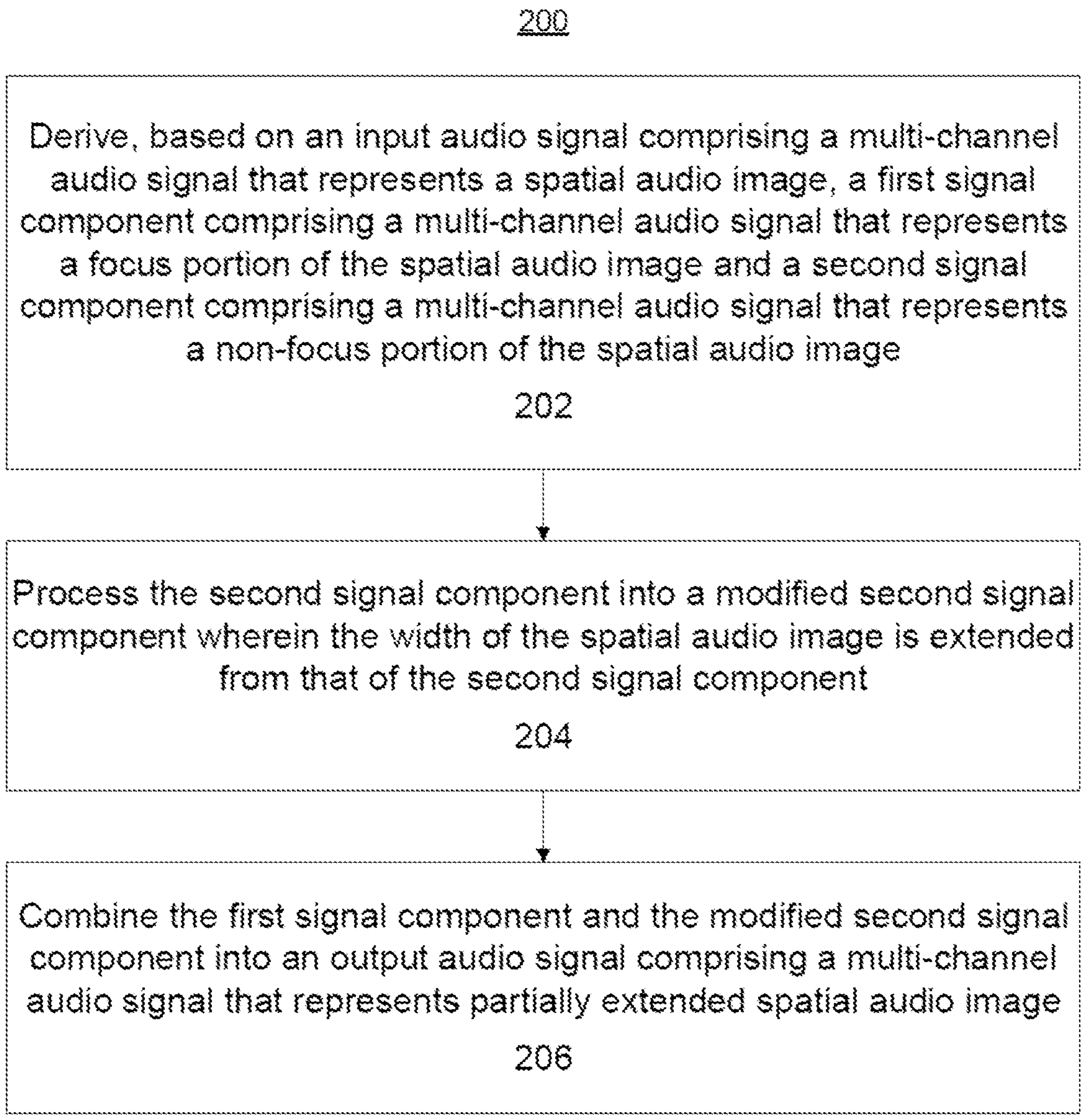
FIG. 6 illustrates a flow chart depicting a method for audio processing according to an example.

Components of the audio processing system 100, 100' may be arranged to operate, for example, in accordance with a method 200 illustrated by a flowchart depicted in FIG. 6. The method 200 serves as a method for processing a input audio signal comprising a multi-channel audio signal that represents a spatial audio image.

The method 200 comprises deriving, based on the input audio signal 101, a first signal component 105-1 comprising a multi-channel audio signal that represents a focus portion of the spatial audio image and a second signal component 105-2 comprising a multi-channel audio signal that represents a non-focus portion of the spatial audio image, as indicated in block 202. The method 200 further comprises processing the second signal component 105-2 into a modified second signal component 113 wherein the width of the spatial audio image is extended from that of the second signal component 105-2, as indicated in block 204. The method 200 further comprises combining the first signal component 105-2 and the modified second signal component 113 into an output audio signal 115 comprising a multi-channel audio signal that represents partially extended spatial audio image, as indicated in block 206. The method 200 may be varied in a number of ways, for example in view of the examples concerning operation of the audio processing system 100 and/or the audio processing system 100' described in the foregoing.

Figure 7:
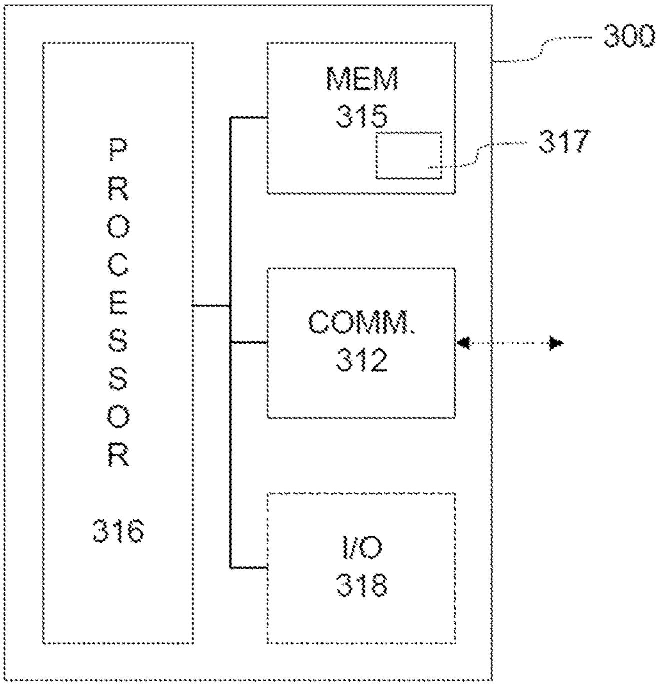
FIG. 7 illustrates a block diagram of some elements of an apparatus according to an example.

FIG. 7 illustrates a block diagram of some components of an exemplifying apparatus 300. The apparatus 300 may comprise further components, elements or portions that are not depicted in FIG. 7. The apparatus 300 may be employed e.g. in implementing one or more components described in the foregoing in context of the audio processing system 100, 100'. The apparatus 300 may implement, for example, the device 50 or one or more components thereof.

The apparatus 300 comprises a processor 316 and a memory 315 for storing data and computer program code 317. The memory 315 and a portion of the computer program code 317 stored therein may be further arranged to, with the processor 316, to implement at least some of the operations, procedures and/or functions described in the foregoing in context of the audio processing system 100, 100'.

The apparatus 300 comprises a communication portion 312 for communication with other devices. The communication portion 312 comprises at least one communication apparatus that enables wired or wireless communication with other apparatuses. A communication apparatus of the communication portion 312 may also be referred to as a respective communication means.

The apparatus 300 may further comprise user I/O (input/output) components 318 that may be arranged, possibly together with the processor 316 and a portion of the computer program code 317, to provide a user interface for receiving input from a user of the apparatus 300 and/or providing output to the user of the apparatus 300 to control at least some aspects of operation of the audio processing system 100, 100' implemented by the apparatus 300. The user I/O components 318 may comprise hardware components such as a display, a touchscreen, a touchpad, a mouse, a keyboard, and/or an arrangement of one or more keys or buttons, etc. The user I/O components 318 may be also referred to as peripherals. The processor 316 may be arranged to control operation of the apparatus 300 e.g. in accordance with a portion of the computer program code 317 and possibly further in accordance with the user input received via the user I/O components 318 and/or in accordance with information received via the communication portion 312.

Although the processor 316 is depicted as a single component, it may be implemented as one or more separate processing components. Similarly, although the memory 315 is depicted as a single component, it may be implemented as one or more separate components, some or all of which may be integrated/removable and/or may provide permanent/semi-permanent/dynamic/cached storage.

The computer program code 317 stored in the memory 315, may comprise computer-executable instructions that control one or more aspects of operation of the apparatus 300 when loaded into the processor 316. As an example, the computer-executable instructions may be provided as one or more sequences of one or more instructions. The processor 316 is able to load and execute the computer program code 317 by reading the one or more sequences of one or more instructions included therein from the memory 315. The one or more sequences of one or more instructions may be configured to, when executed by the processor 316, cause the apparatus 300 to carry out at least some of the operations, procedures and/or functions described in the foregoing in context of the audio processing system 100, 100'.

Hence, the apparatus 300 may comprise at least one processor 316 and at least one memory 315 including the computer program code 317 for one or more programs, the at least one memory 315 and the computer program code 317 configured to, with the at least one processor 316, cause the apparatus 300 to perform at least some of the operations, procedures and/or functions described in the foregoing in context of the audio processing system 100, 100'.

The computer program(s) stored in the memory 315 may be provided e.g. as a respective computer program product comprising at least one computer-readable non-transitory medium having the computer program code 317 stored thereon, the computer program code, when executed by the apparatus 300, causes the apparatus 300 at least to perform at least some of the operations, procedures and/or functions described in the foregoing in context of the audio processing system 100, 100'. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Reference(s) to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

Although in the foregoing some functions have been described with reference to certain features and/or elements, those functions may be performable by other features and/or elements whether described or not. Although features have been described with reference to certain embodiments, those features may also be present in other embodiments whether described or not.

The invention claimed is:

1. An apparatus for processing an input audio signal comprising a multi-channel audio signal, the apparatus comprising at least one processor; and at least one memory including computer program code, which when executed by the at least one processor, causes the apparatus to:

derive, based on the input audio signal, a first signal component comprising a multi-channel audio signal that represents a focus portion of a spatial audio image conveyed by the input audio signal and a second signal component comprising a multi-channel audio signal that represents a non-focus portion of the spatial audio image, wherein the first signal component comprises coherent sounds of the input audio signal with a predefined focus range and the second signal component comprises (i) coherent sounds that are outside the predefined focus range and (ii) non-coherent sound sources;

process the first signal component into a modified first signal component such that one or more sound sources represented by the first signal component are repositioned in the spatial audio image in dependence on one or more of a target loudspeaker configuration and an output loudspeaker configuration;

process the second signal component into a modified second signal component wherein a width of the spatial audio image is extended from that of the second signal component; and combine the modified first signal component and the modified second signal component into an output audio signal comprising a multi-channel audio signal that represents a partially extended spatial audio image.

2. An apparatus according to claim 1, wherein the apparatus caused to derive the first and second signal components is further caused to:

derive, on basis of the input audio signal, for a plurality of frequency sub-bands, a respective coherence value that is descriptive of coherence between channels of the input audio signal in the respective frequency sub-band;

derive, on basis of estimated sound arrival directions in view of said predefined focus range, for said plurality of frequency sub-bands, a respective focus coefficient that is indicative of a relationship between the estimated sound arrival direction and the predefined focus range in the respective frequency sub-band;

derive, on basis of said coherence values and focus coefficients, for said plurality of frequency sub-bands, a respective decomposition coefficient; and decompose the input audio signal into the first and second signal components using said decomposition coefficients.

3. An apparatus according to claim 2, wherein the apparatus caused to derive the focus coefficients is arranged to, for said plurality of frequency sub-bands, set the focus coefficient for a frequency sub-band to a non-zero value in response to the estimated sound arrival direction for said frequency sub-band residing within the focus range, and set the focus coefficient for a frequency sub-band to a zero value in response to the estimated sound arrival direction for said frequency sub-band residing outside the focus range.

4. An apparatus according to claim 2, wherein the apparatus caused to determine the decomposition coefficients is arranged to derive, for said plurality of frequency sub-bands, the respective decomposition coefficient as the product of the coherence value and the focus coefficient derived for the respective frequency sub-band.

5. An apparatus according claim 2, wherein the apparatus caused to decompose the input audio signal is arranged to, for said plurality of frequency sub-bands, derive the first signal component in each frequency sub-band as a product of the input audio signal in the respective frequency sub-band and a first scaling coefficient that increases with increasing value of the decomposition coefficient derived for the respective frequency sub-band; and derive the second signal component in each frequency sub-band as a product of the input audio signal in the respective frequency sub-band and a second scaling coefficient that decreases with increasing value of the decomposition coefficient derived for the respective frequency sub-band.

6. An apparatus according to claim 1, wherein the apparatus is further caused to delay the first signal component by a predefined time delay prior to combining the modified first signal component with the modified second signal component, so as to create a delayed first signal component that is temporally aligned with the modified second signal component.

7. An apparatus according to claim 1, wherein the target loudspeaker configuration defines, for each channel of the input audio signal, a respective target loudspeaker position with respect to an assumed listening position, and the output loudspeaker configuration defines, for each output loudspeaker, a respective output loudspeaker position with respect to the listening position.

8. An apparatus according to claim 7, wherein one or more of the following applies:

the target loudspeaker configuration defines, for each channel of the input audio signal, a target direction defined as an angle with respect to a reference direction; or the output loudspeaker configuration defines, for each output loudspeaker, a respective output loudspeaker direction with respect to the reference direction.

9. An apparatus according to claim 7, wherein the apparatus caused to process the first signal component into the modified first signal component further causes the apparatus to:

modify estimated arrival directions of one or more sound sources represented by the first signal component in dependence of differences between the target loudspeaker configuration and the output loudspeaker configuration;

compute, based on the modified arrival directions, a respective panning gain for a plurality of frequency sub-bands for each channel of the first signal component;

derive, based on the panning gains and estimated energy levels in said plurality of frequency sub-bands in channels of the first signal component, a respective re-panning gain for a plurality of frequency sub-bands for each channel of the first signal component; and derive, based on the first signal component in dependence of the re-panning gains, the modified first signal component in said plurality of frequency sub-bands for each channel of the first signal component.

10. An apparatus according to claim 9, wherein the apparatus caused to derive the modified first signal component is arranged to derive the modified first signal component in each frequency sub-band and in each channel as a product of the first signal component in the respective frequency sub-band in the respective channel and the re-panning gain derived for the respective frequency sub-band in the respective channel.

11. An apparatus according to claim 1, wherein each of said multi-channel audio signals comprises a respective two-channel audio signal.

12. An apparatus for processing an input audio signal comprising a multi-channel audio signal, the apparatus comprising at least one processor; and at least one memory including computer program code, which when executed by the at least one processor, causes the apparatus to:

derive, based on the input audio signal, a first signal component comprising a multi-channel audio signal that represents a focus portion of a spatial audio image conveyed by the input audio signal and a second signal component comprising a multi-channel audio signal that represents a non-focus portion of the spatial audio image;

process the second signal component into a modified second signal component wherein a width of the spatial audio image is extended from that of the second signal component; and combine the first signal component and the modified second signal component into an output audio signal comprising a multi-channel audio signal that represents a partially extended spatial audio image, wherein the apparatus caused to derive the first and second signal components is further caused to derive, on basis of the input audio signal, the first signal component that represents coherent sounds of the spatial audio image that reside within a predefined focus range; and derive, on basis of the input audio signal, the second signal component that represents coherent sounds of the spatial audio image that reside outside the predefined focus range and non-coherent sounds of the spatial audio image, and wherein said focus range comprises one or more predefined angular ranges that define a set of sound arrival directions within the spatial audio image.

13. An apparatus according to claim 12, wherein said one or more angular ranges comprise an angular range that defines a range of sound arrival directions centered around the front direction of the spatial audio image.

14. A method for processing an input audio signal comprising a multi-channel audio signal, the method comprising:

deriving, based on the input audio signal, a first signal component comprising a multi-channel audio signal that represents a focus portion of a spatial audio image conveyed by the input audio signal and a second signal component comprising a multi-channel audio signal that represents a non-focus portion of the spatial audio image, wherein the first signal component comprises coherent sounds of the input audio signal with a predefined focus range and the second signal component comprises (i) coherent sounds that are outside the predefined focus range and (ii) non-coherent sound sources;

processing the first signal component into a modified first signal component such that one or more sound sources represented by the first signal component are repositioned in the spatial audio image in dependence of one or more of a target loudspeaker configuration and an output loudspeaker configuration;

processing the second signal component into a modified second signal component wherein a width of the spatial audio image is extended from that of the second signal component; and combining the modified first signal component and the modified second signal component into an output audio signal comprising a multi-channel audio signal that represents partially extended spatial audio image.

15. The method according to claim 14, wherein deriving the first and second signal components comprises:

deriving, on basis of the input audio signal, for a plurality of frequency sub-bands, a respective coherence value that is descriptive of coherence between channels of the input audio signal in the respective frequency sub-band;

deriving, on basis of estimated sound arrival directions in view of said predefined focus range, for said plurality of frequency sub-bands, a respective focus coefficient that is indicative of a relationship between the estimated sound arrival direction and the predefined focus range in the respective frequency sub-band;

deriving, on basis of said coherence values and focus coefficients, for said plurality of frequency sub-bands, a respective decomposition coefficient; and decomposing the input audio signal into the first and second signal components using said decomposition coefficients.

16. The method according to claim 15, wherein deriving the focus coefficients is arranged to, for said plurality of frequency sub-bands, set the focus coefficient for a frequency sub-band to a non-zero value in response to the estimated sound arrival direction for said frequency sub-band residing within the focus range, and set the focus coefficient for a frequency sub-band to a zero value in response to the estimated sound arrival direction for said frequency sub-band residing outside the focus range.

17. A method for processing an input audio signal comprising a multi-channel audio signal, the method comprising:

deriving, based on the input audio signal, a first signal component comprising a multi-channel audio signal that represents a focus portion of a spatial audio image conveyed by the input audio signal and a second signal component comprising a multi-channel audio signal that represents a non-focus portion of the spatial audio image;

processing the second signal component into a modified second signal component wherein a width of the spatial audio image is extended from that of the second signal component; and combining the first signal component and the modified second signal component into an output audio signal comprising a multi-channel audio signal that represents a partially extended spatial audio image, wherein deriving the first and second signal components further comprises:

deriving, on basis of the input audio signal, the first signal component that represents coherent sounds of the spatial audio image that reside within a predefined focus range; and deriving, on basis of the input audio signal, the second signal component that represents coherent sounds of the spatial audio image that reside outside the predefined focus range and non-coherent sounds of the spatial audio image, and wherein said focus range comprises one or more predefined angular ranges that define a set of sound arrival directions within the spatial audio image.

18. The method according to claim 17, wherein said one or more angular ranges comprise an angular range that defines a range of sound arrival directions centered around the front direction of the spatial audio image.

* * * * *